July 1, 1952  D. R. HAMILTON  2,602,157
ULTRAHIGH-FREQUENCY VARIABLE IMPEDANCE ELEMENT
Filed May 31, 1946  7 Sheets-Sheet 1

INVENTOR
DONALD R. HAMILTON
BY Paul B. Hunter
ATTORNEY

July 1, 1952  D. R. HAMILTON  2,602,157
ULTRAHIGH-FREQUENCY VARIABLE IMPEDANCE ELEMENT
Filed May 31, 1946  7 Sheets-Sheet 2
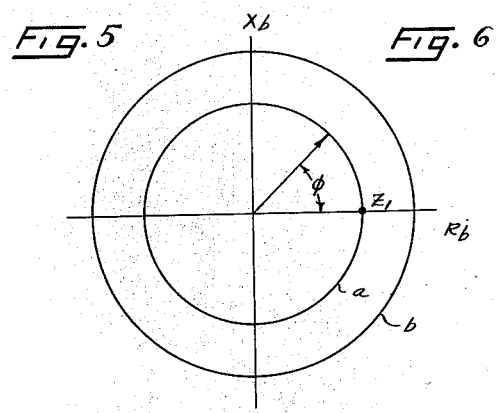
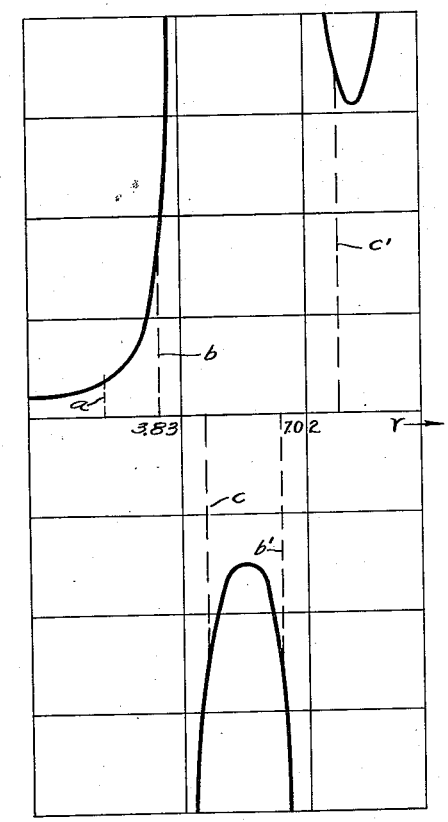
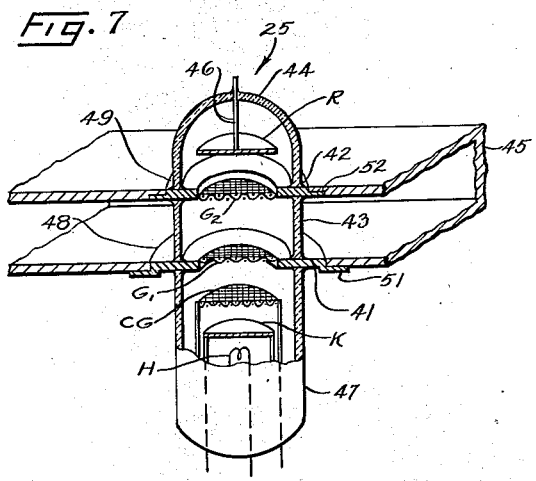
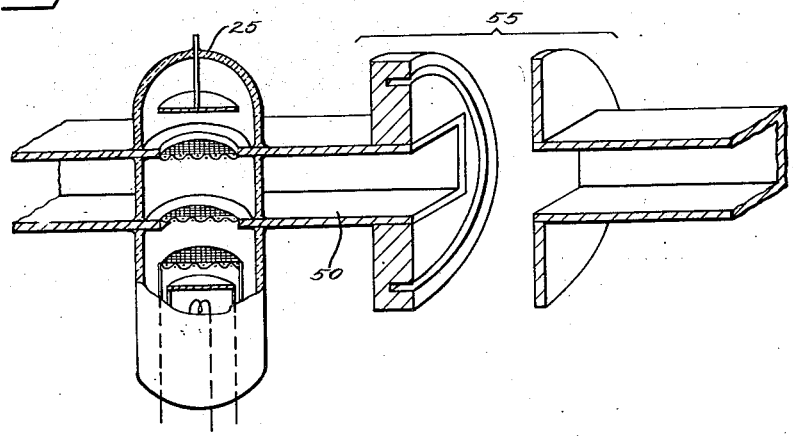
INVENTOR
DONALD R. HAMILTON
BY  Paul B. Hunter
ATTORNEY July 1, 1952 D. R. HAMILTON 2,602,157
ULTRAHIGH-FREQUENCY VARIABLE IMPEDANCE ELEMENT
Filed May 31, 1946 7 Sheets-Sheet 3

INVENTOR
DONALD R. HAMILTON
BY
ATTORNEY

July 1, 1952  D. R. HAMILTON  2,602,157
ULTRAHIGH-FREQUENCY VARIABLE IMPEDANCE ELEMENT
Filed May 31, 1946  7 Sheets-Sheet 4

INVENTOR
DONALD R. HAMILTON
BY Paul B. Hunter
ATTORNEY

July 1, 1952 D. R. HAMILTON 2,602,157
ULTRAHIGH-FREQUENCY VARIABLE IMPEDANCE ELEMENT
Filed May 31, 1946 7 Sheets-Sheet 5

INVENTOR
DONALD R. HAMILTON
BY Paul B. Hunter
ATTORNEY

July 1, 1952     D. R. HAMILTON     2,602,157
ULTRAHIGH-FREQUENCY VARIABLE IMPEDANCE ELEMENT
Filed May 31, 1946     7 Sheets-Sheet 6
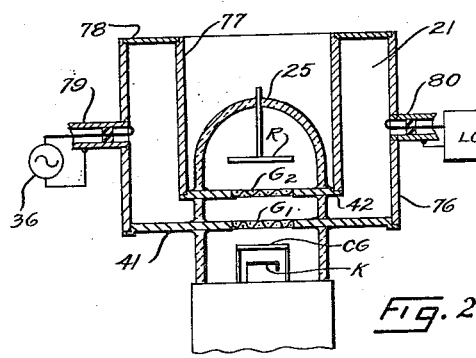
Fig. 20
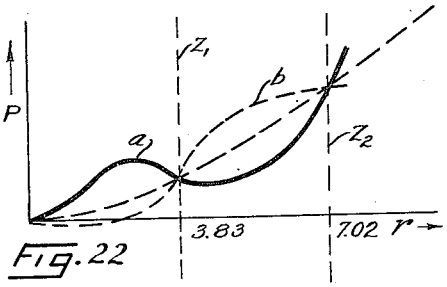
Fig. 22
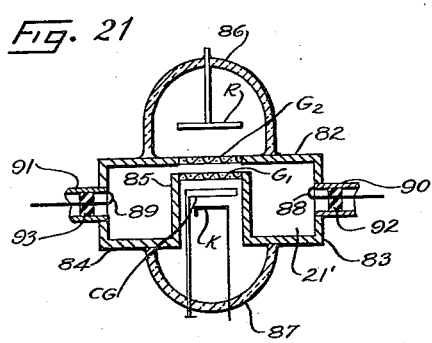
Fig. 21
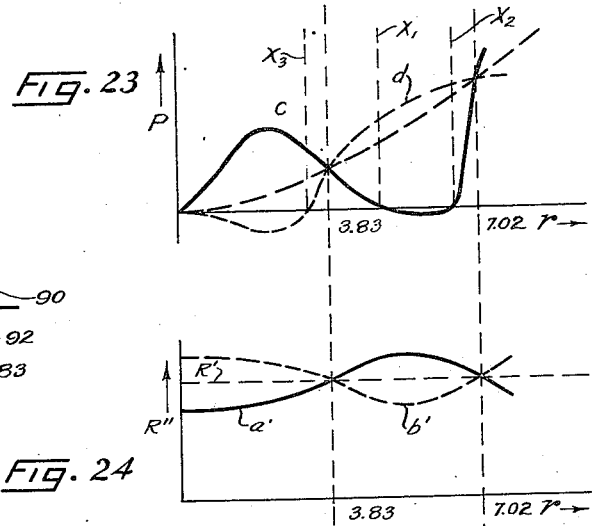
Fig. 23
Fig. 24
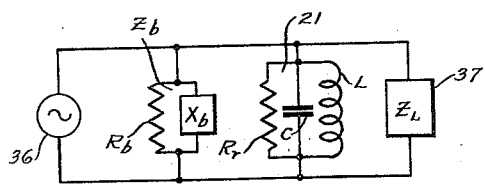
Fig. 26
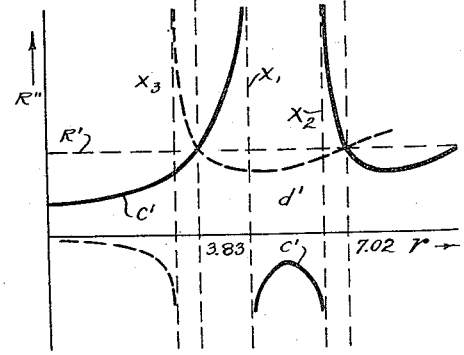
Fig. 25
INVENTOR
DONALD R. HAMILTON
BY Paul B. Hunter
ATTORNEY July 1, 1952 D. R. HAMILTON 2,602,157
ULTRAHIGH-FREQUENCY VARIABLE IMPEDANCE ELEMENT
Filed May 31, 1946 7 Sheets-Sheet 7

INVENTOR
DONALD R. HAMILTON
BY Paul B. Hunter
ATTORNEY

Patented July 1, 1952

2,602,157

UNITED STATES PATENT OFFICE 2,602,157

ULTRAHIGH-FREQUENCY VARIABLE IMPEDANCE ELEMENT

Donald R. Hamilton, Princeton, N. J., assignor to The Sperry Corporation, a corporation of Delaware Application May 31, 1946, Serial No. 673,222

26 Claims. (Cl. 332—7)

1

The present invention relates to the art including apparatus operative in the ultra-high frequency and super-high frequency ranges of the frequency spectrum and, more particularly, to electrically variable impedance elements having a wide variety of uses in these frequency ranges.

In the ultra-high and super-high frequency ranges (for example, for frequencies above 300 megacycles per second corresponding to wavelengths shorter than one meter) conventional circuit elements, such as resistors, inductors, capacitors, and conductors, assume forms of a highly specialized nature differing greatly from the corresponding elements at lower frequencies or useful with direct current. The special problems incident to the conduction, modification, and radiation of energy of these frequencies requires highly specialized apparatus to perform the normal functions in conjunction therewith, various specialized types of which have heretofore been devised. However, in none of the known devices is provision made for a widely and readily variable impedance element capable of producing impedance values covering a wide range of resistive and reactive components, either of these components being positive or negative at will, and readily controllable in magnitude by electrical potentials.

Accordingly, it is an object of the present invention to provide a variable impedance element useful at ultra-high and super-high frequencies and readily controllable either manually or electrically over a wide range of impedance values.

It is another object of the present invention to provide a variable impedance element adapted to serve a wide variety of functions at ultra-high and super-high frequencies, such as a variable impedance transformer, a variable phase shifter, a repeater or amplifier, a variable terminating impedance, a variable non-linear impedance, a signal expander, a limiter, an amplitude and/or frequency modulator, a tuning control, a power divider, a noise source, a variable selectivity circuit, a variable frequency circuit, or a variable feedback control, among other.

The present invention makes use of the impedance properties of an electron stream to provide a useful variable impedance element serving many of the functions enumerated above. It has been discovered that when an electron stream is passed through a pair of grids between which is impressed an alternating voltage, and is thereafter reflected to be returned through the same pair of grids, in a manner avoiding the production

2 of oscillations, an adjustable impedance is offered to the impressed voltage which may be controlled, both in magnitude and phase angle or as to resistive and reactive components, by the adjustment of one or more parameters associated with the electron stream, namely, the accelerating voltage producing the electron stream, the magnitude of the stream current, or the reflecting voltage producing the reversal of the path of the electrons of the stream. Such impedance variations are highly useful in a great variety of systems as long as the electron discharge is maintained in a passive condition in which self-generating oscillations are prevented.

The present invention provides several different forms of electron discharge device useful as such a variable impedance element and also provides a number of different systems utilizing such a device, either to provide functions corresponding to those provided at lower frequencies by conventional devices or functions ordinarily impossible at such lower frequencies.

The invention in another of its aspects relates to novel features of the instrumentalities described herein for achieving the principal objects of the invention and to novel principles employed in those instrumentailities, whether or not these features and principles are used for the said principal objects or in the said field.

A further object of the invention is to provide improved apparatus and instrumentalities embodying novel features and principles, adapted for use in realizing the above objects and also adapted for use in other fields.

The present invention and other objects thereof will become clearer upon consideration of the following specification and appended drawings in which:

Figs. 3, 4, 5 and 6 are various curves and graphs useful in explaining the theory of operation of the present invention;

Fig. 7 is a perspective view, partly in cross-section, of one practical embodiment of the present invention, useful in conjunction with a wave guide;

Fig. 8 is a similar perspective view, partly in cross-section, of a modification of the device of Fig. 7;

Figs. 20 and 21 are elevation views, partly in cross-section, of a further modification of the devices of Figs. 7, 8, 8A and 19 incorporating a cavity resonator;

Figs. 22–25 are curves useful in explaining the operation of the devices of Figs. 2 and 21;

Fig. 26 is an equivalent schematic circuit diagram for the apparatus of Figs. 20 and 21;

In the following figures, like structures are given the same reference numerals.

Fig. 1 shows diagrammatically the circuit for an electron discharge device 25 having variable impedance properties, and useful, as will be seen, as a variable impedance element at ultra-high frequencies. This device comprises an electron-emissive cathode K, a control grid CG, a pair of velocity-modulating grids $G_1$ and $G_2$, and a reflector electrode R, all in alignment with one another.

Grids $G_1$ and $G_2$ have an oscillating voltage $e = E \sin \omega t$ impressed therebetween, of radian frequency $\omega$. However, these grids $G_1$, $G_2$ are usually maintained at the same unidirectional potential $E_0$ with respect to cathode K, as by means of their connection to the same adjustable electron-beam-accelerating source 29, through respective radio frequency choke coils 18, 19 which prevent a high frequency short-circuit between these grids $G_1$, $G_2$. Control grid CG is maintained at an adjustable negative or positive potential $E_G$ relative to cathode K by means of adjustable voltage source 32. Reflector R is similarly maintained at an adjustable unidirectional negative or positive potential $E_R$ relative to grids $G_1$, $G_2$ by its connection to cathode K through adjustable voltage source 31. Generally, both control grid CG and reflector R are maintained slightly negative relative to cathode K, although under certain conditions either may be positive relative to cathode K.

Figure 2:
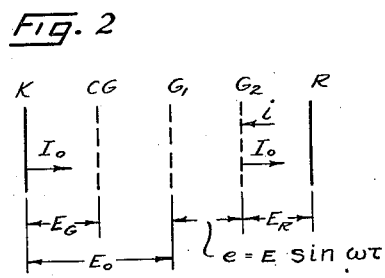
Fig. 2 is a schematic representation of the several electrodes of the variable impedance element of Fig. 1 showing their respective relative potentials.

Fig. 2 shows schematically the various electrodes and their relative potentials. Cathode K, grid $G_1$, and accelerating voltage source 29 serve as an electron gun to project a uniform-velocity constant-intensity electron stream through grids $G_1$ and $G_2$ toward reflector R. The magnitude $I_0$ of this electron stream is adjustable by adjusting the control grid potential $E_G$, as by varying voltage source 32.

This constant-intensity and uniform-velocity electron stream is subjected to the oscillating electric field produced by the alternating voltage $e = E \sin \omega t$ between grids $G_1$ and $G_2$. Voltage $e$ may be impressed between grids $G_1$ and $G_2$ in any suitable manner, the direct connection to source 36 shown in Fig. 1 being merely a schematic illustration of one way of producing this voltage $e$ between grids $G_1$ and $G_2$. The oscillating electric field in the gap between these grids $G_1$ and $G_2$ alternately accelerates and decelerates the electrons of the stream. Thus, electrons passing through the gap between grids $G_1$ and $G_2$ during the alternate half-cycles of voltage $e$ when $G_2$ is positive relative to $G_1$ will be accelerated, while those passing through the gap in the other half-cycles will be decelerated. This action is termed velocity-modulation of the electrons of the stream.

The velocity-modulated electrons thus produced are subjected to the retarding and reflecting unidirectional electric field between grid $G_2$ and reflector R, produced by the voltage $E_R$ impressed between these electrodes R and $G_2$. This field causes the electrons decelerated in the grid gap to return to the gap more quickly than the electrons accelerated in the gap. As a result, the electrons group together, and the reflected electron stream which re-enters the grid gap through grid $G_2$ will have a high frequency current component $i$ of the frequency $\omega$ which is given by the expression $$i = 2I_0 J_1(r) \sin(\omega t - \phi)$$
$$= I \sin(\omega t - \phi) \quad (1)$$

where $$I = 2I_0 J_1(r)$$

Here $$r = \pi N m E / E_0 \quad (2)$$

where N is the bunching time of the average-velocity electron (which passes through the grid gap at the instant when $e = 0$, and is hence neither accelerated nor decelerated) in the reflector field space between R and $G_2$, measured in number of cycles of the frequency $\omega$. Also, $m$ is the beam coupling coefficient indicating the effectiveness of interaction of the electrons with where $k$ is a constant determined by the spacing between R and $G_2$. It is usually much more convenient to vary $\phi$ (or N) by adjusting $E_R$ than by varying $E_0$, since this requires only a small variation of the relatively small voltage source 31 of Fig. 1, which has little or no current drain, instead of varying the main energy source 29. Also, a wider variation in $\phi$ is produced in response to a smaller change in voltage.

Figure 4:
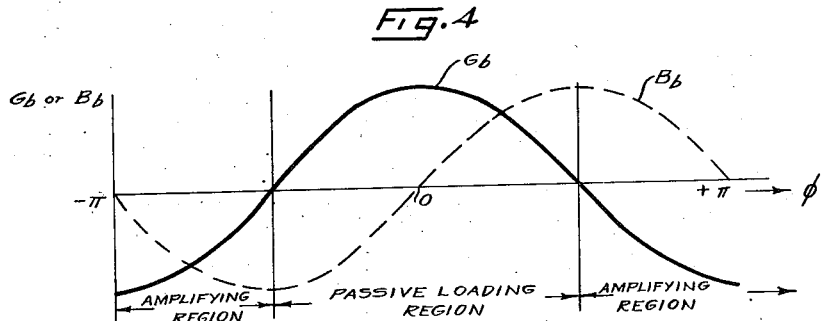

Variation of $\phi$ varies $R_b$ and $X_b$ differently, since it varies the "phase angle" of the impedance $Z_b$. Fig. 4 shows the variation of conductance $G_b$ and susceptance $B_b$ with $\phi$, for constant E. In the regions where $G_b$ is negative, the stream acts the regions where $G_b$ is positive, the electron stream acts as a passive load. In the region where $G_b$ is negative, the stream acts as an amplifier. Where conductance $G_b$ is zero, shunt resistance $R_b$ is infinite, and the stream acts as a pure reactance. Where susceptance $B_b$ is zero, the shunt reactance $X_b$ is infinite and the stream acts as a pure resistance. For other values of $\phi$, the stream acts as a complex impedance $Z_b$ or admittance $Y_b$. These values of $R_b$, $X_b$ and $Z_b$ (or $G_b$, $B_b$ and $Y_b$) are periodic in $\phi$, and repeat for every change of $2\pi$ in $\phi$. Hence, a complete range of variation in these values is obtained for a variation of $\phi$ over $2\pi$, which forms the useful range of variation of $\phi$.

The variation of $Z_b$ with $\phi$ and $I_0$ (E assumed fixed) may also be illustrated by Fig. 5, which is a plot of $X_b$ versus $R_b$ for different values of $I_0$ and $\phi$ for small signals. Hence, each point of the plot represents a value of $Z_b$. Curve $a$ is a circle with center at the origin, and represents all values of $Z_b$ obtainable for a given fixed $I_0$. As $\phi$ varies from zero to $2\pi$, $Z_b$ varies from $Z_1$ counterclockwise completely around circle $a$. Curve $b$ is a similar locus for a different value of $I_0$. Hence, $I_0$ determines the radius of the circle, and $\phi$ determines the point of the circle which represents $Z_b$. This also shows that the limit on the impedance values obtainable is only the maximum current which can be used. (NOTE:—If the variation of N is considered, these circles $a$ and $b$ become spirals.)

Variation in $r$ also affects $R_b$ and $X_b$. As stated above, $r = \pi N m E/E_0$. Of these terms, N and $m$ change but little and may be considered constant. Therefore, the major variation in $r$ is determined by $E/E_0$. For a given $E_0$, $r$ is proportional to E. Fig. 6 shows how $R_b$ or $X_b$ varies with $r$, $\cos \phi$ being assumed constant and positive. This curve shows that the polarity of $R_b$ and $X_b$ will alternate, changing each time a zero of the function $J_1(r)$ is passed. Fig. 6 also graphically illustrates that $Z_b$ is a non-linear impedance, since $R_b$ and $X_b$ change radically and non-linearly with the voltage.

However, for small values of $r$ (say, less than 1), $R_b$ and $X_b$ are linear, being substantially independent of $r$ or E. This is shown to the left of ordinate $a$ in Fig. 6.

Figure 1:
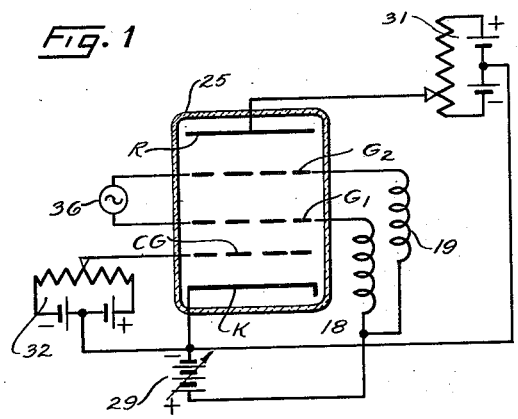
Fig. 1 is a schematic circuit diagram of the impedance element of the present invention useful in explaining its operation.

The device 25 of Fig. 1 therefore provides an impedance element which is readily adjusted in response to electrical signals applied to reflector R, control grid CG or cathode K, to have a wide range of resistance or reactance, either positive or negative, and useful in many ultra-high-frequency applications, some of which are described hereinafter.

Fig. 7 shows one structural form which the variable impedance device of the present invention may take, especially adapted to cooperate with a metallic hollow-pipe wave guide, although not restricted thereto. In this form of the device, the gap grids $G_1$ and $G_2$ are located substantially at the center of respective conducting plate members 41 and 42. Interposed between the plate members 41 and 42 and sealed thereto by a vacuum seal is an insulating cylinder 43, such as of glass, which forms part of the vacuum envelope enclosing the electron stream and also serves to space the grids $G_1$ and $G_2$ the proper distance apart. An insulating end bell 44 is sealed to the other side of plate member 42 and supports the reflector R centrally thereof by means of the rigid lead 46. Cathode K, control grid CG and the heater H for the cathode K are supported in conventional fashion from a tube base 47 which is sealed to the lower side of plate 41 to complete the vacuum envelope for the electron discharge path.

Plate members 41 and 42 are adapted to cooperate with opposite walls of a rectangular wave guide 45. For this purpose, the opposite walls of the wave guide are provided with respective apertures 48 and 49. Preferably aperture 48 is slightly larger than aperture 49. Similarly, plate member 41 is made larger than plate member 42, and each of these plate members is adapted to fit snugly within the respective wave guide apertures 48 and 49 so that the plate members 41 and 42 and grids $G_1$ and $G_2$ substantially form continuations of the wave guide walls. To make good contact between the plate members 41, 42 and the opposite walls of the wave guide 45, these plate members may be provided with offset flexible rings 51 and 52 having spring fingers contacting the walls of the wave guide. Accordingly, the variable impedance element device 25 may be inserted into the openings 48, 49 of wave guide 45, being held therein by any suitable socket or holding device (not shown). Grids $G_1$ and $G_2$ thereby effectively form portions of the opposite walls of the wave guide 45, at the center thereof.

Since a substantial alternating voltage exists between the centers of these opposed wave guide walls during the normal transmission of high frequency energy down wave guide 45, this voltage will be impressed between grids $G_1$ and $G_2$, and the device will then operate in the manner discussed above. It is to be understood that the circuit associated with the device of Fig. 7 may be similar to that shown in Fig. 1, or of any of the forms shown hereinbelow.

It will also be understood that the variable impedance element may be permanently incorporated within a section of wave guide if so desired, as by fixedly mounting grids $G_1$ and $G_2$ in apertures in the opposite walls of such a wave guide section and sealing the insulating members 43 and 44 and the tube base 47 to the walls of the wave guide instead of to the plate members 41 and 42. This arrangement is shown in Fig. 8 where the wave guide section 50, in which the device 25 is integrally constructed, is shown as provided with conventional choke joints or coupling terminals 55 for coupling to other similar wave guide sections.

Figure 8A:
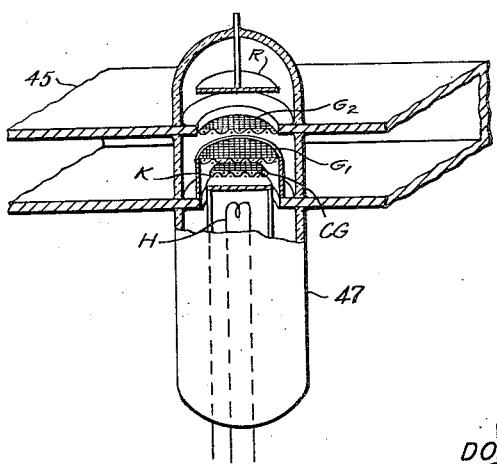
Fig. 8A is a similar perspective view, partly in cross-section, of still another embodiment of the invention shown in Figs. 7 and 8.

In either Fig. 7 or Fig. 8, one of grids $G_1$ and $G_2$ may be put closer to the other to reduce the gap transit time and increase $m$. This would require connecting that one grid to the wave guide wall by a cylindrical "pole piece," as shown in Fig. 8A.

The apparatus shown in Figs. 7, 8 or 8A is capable of a wide variety of uses wherever a variable impedance element is desired in ultrathe gap field, and depending on the transit time of the electrons between $G_1$ and $G_2$. Here, $$m = \frac{\sin \pi d}{\pi d}$$

where $d$ is the gap length between $G_1$ and $G_2$, measured in terms of the distance travelled by an electron of average or gun velocity in one cycle of the frequency $\omega$. The gap efficiency factor $m$ is usually very close to unity for gap transit times short compared to a quarter-cycle of the operating frequency $\omega$, such as are usually encountered, and will be considered to have that value hereinafter. $J_1(r)$ is the Bessel function of the first kind and first order, with argument $r$. $\phi$ is the phase between the current $i$ and the voltage $e$, taken as zero when the instantaneous maximum of voltage $e$ across the gap occurs simultaneously with the instantaneous maximum of the radio frequency component of the reflected electron current $i$ through the gap, with the voltage having a sense or polarity to accelerate the reflected electrons. In this situation, the reflected electron stream absorbs maximum energy from the oscillating field in the gap between grids $G_1$ and $G_2$.

The phase $\phi$ and the bunching time $N$ are, of course, related. When $\phi$ is zero, $N$ equals some integer plus $\frac{1}{4}$. In general, $$\phi = -\frac{\pi}{2} + 2\pi N$$

where $N$ is not necessarily an integre. The meaningful range of variation of $\phi$ is from $-\pi$ to $+\pi$, since in this range $\cos \phi$ assumes all its possible values. $N$ is usually fairly large, as of the order of 5. For $-\pi < \phi < \pi$, $N$ only varies by an amount 1, so that for most purposes $N$ can be considered as a relatively constant parameter in what follows.

For small gap transit times (where $m = 1$), the first passage of the electrons of the stream through the gap will, on the average, extract substantially no energy from the gap field. Thus, when the field accelerates electrons, work is done by the field on the electrons. When the field decelerates electrons, the electrons do work on the field. Since as many electrons are decelerated as are accelerated, and in equal amounts, on the average there is no energy exchange between the field and the electrons.

As to the reflected stream, however, a different situation exists. Now there is interaction between the alternating electron current component $i$ and the alternating field, and the exchange of power is given by $$P = \tfrac{1}{2}\overline{iem} \qquad (3)$$

where the bar over the right member indicates a time average. Hence, $$P = \tfrac{1}{2} I E m \cos \phi = I_0 E m J_1(r) \cos \phi \qquad (4)$$

When $\phi = 0$, maximum power is absorbed by the electron stream from the field, and hence from source 36 which produces the field. For other values of $\phi$, less power is taken from the field. For $\cos \phi$ negative, power is even given to the field.

The entire device 25 acts as a variable impedance element connected across the source 36 and having an impedance value given by $$Z_b = \frac{E}{Im} \epsilon^{i\phi} = \frac{E}{2 I_0 m J_1(r)} \epsilon^{i\phi}$$

$$= \frac{R_0}{\pi N m} \frac{r}{2 J_1(r) m} \epsilon^{i\phi} \qquad (5)$$

where $$R_0 = \frac{E_0}{I_0}$$

and is the D. C. beam impedance.

This variable impedance $Z_b$ may be considered to be formed by a parallel-connected resistor and reactor, of resistance $R_b$ and reactance $X_b$, given by $$R_b = \frac{R_0}{\pi N m} \frac{r}{2 J_1(r) m} \frac{1}{\cos \phi} \qquad (6)$$

$$X_b = \frac{R_0}{\pi N m} \frac{r}{2 J_1(r) m} \frac{1}{\sin \phi} \qquad (7)$$

Alternatively, the device may be considered to have an admittance $Y_b$, with a conductive component $$G_b = \frac{\pi N m}{R_0} \frac{2 J_1(r) m}{r} \cos \phi \qquad (8)$$

and a susceptive component $$B_b = \frac{\pi N m}{R_0} \frac{2 J_1(r) m}{r} \sin \phi \qquad (9)$$

It will be noted that $$P = \tfrac{1}{2}\frac{E^2}{R_b} = \tfrac{1}{2}\frac{E^2 \pi N m}{R_0}\frac{2 J_1(r) m}{r} \cos \phi$$

$$= I_0 E m J_1(r) \cos \phi \qquad (10)$$

as above.

In this last expression (10) for $P$, it will be seen that $I_0$, $E$ and $m$ are always positive. $J_1(r)$ is also positive for $r$ less than 3.83. Since $N$ and $m$ are substantially constant, the value of $r$ (and hence of $J_1(r)$) is determined mainly by $E/E_0$, which is usually less than 0.5.

However, $\phi$ may vary from $-\pi$ to $+\pi$, so that $\cos \phi$ may be negative or positive. For $$-\frac{\pi}{2} < \phi < \frac{\pi}{2}$$

$\cos \phi$ is positive, and the electron stream acts as a passive load, absorbing energy from the source 36, this energy being "dissipated" in the effective beam resistance $R_b$. For negative values of $\cos \phi$, power is delivered from the electron stream to the field. Hence, the apparatus operates as an amplifier, the energy of the voltage source 29 being transferred to the oscillating electric field in the gap. The resistance $R_b$ is negative under these conditions.

From this discussion and from Equations 6 and 7, it is clear that the value of the equivalent resistance $R_b$ and reactance $X_b$ of the present device 25 is determined by $E$, $I_0$, $\phi$, and $r$. The value of $E$ is generally determined by system conditions, and is ordinarily not available for adjustment for the purpose of varying or controlling $R_b$ and $X_b$. $I_0$ may be readily controlled by adjusting $E_G$. Such adjustment varies the absolute value of $Z_b$, and hence varies $R_b$ and $X_b$ equally and similarly.

Figure 3:
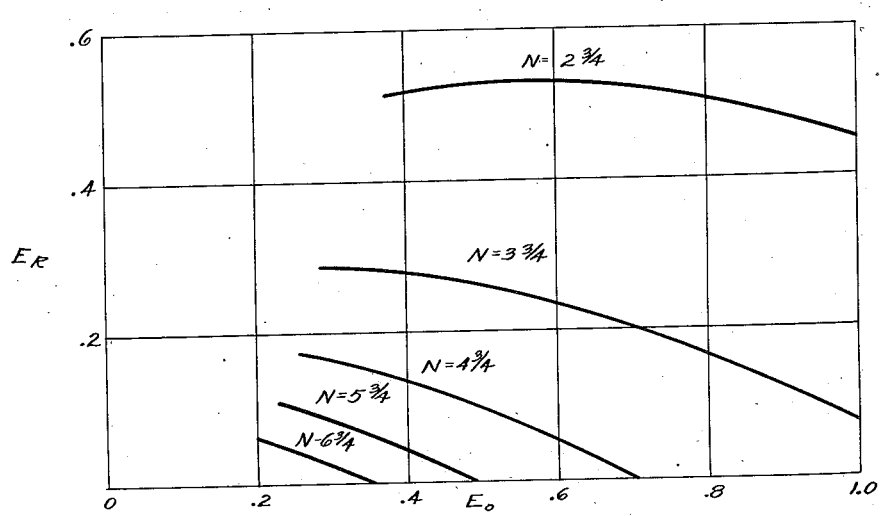

The phase angle $\phi$ is most readily varied by varying $E_R$. Even a relatively small change in $E_R$ can vary $\phi$ through a range of $2\pi$ (or 360°). $\phi$ can also be varied by varying $E_0$. The dependence of $\phi$ upon $E_0$ and $E_R$ is illustrated in Fig. 3, which shows a series of curves in which $E_R$ is plotted against $E_0$, each curve having constant $\phi$ (and hence constant $N$).

Analytically, it can be shown that, for a plane parallel reflector, and ignoring space charge, $$N = \frac{k \omega \sqrt{E_0}}{E_R}$$

high-frequency systems. Some of the more important of these uses are described hereinbelow with respect to the following figures.

Figure 9:
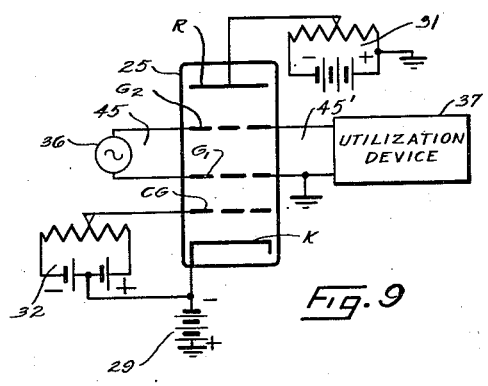
Fig. 9 is a schematic circuit diagram of a system using the variable impedance element of the present invention as an impedance transformer, phase shifter, repeater, amplifier, terminating impedance, non-linear impedance, signal expander or signal limiter.

Referring to Fig. 9, the variable impedance device 25, of the construction shown in Figs. 7, 8 or 8A is indicated schematically as incorporated in a wave guide 45, 45' extending between a source 36 and a load or other utilization device 37. As is well known in the ultra-high-frequency art, it is desirable when coupling a source to a load or utilization device to prevent or minimize standing waves in the high frequency energy conductors coupling the source and load. The device 25 of the present invention provides a simple and easy method of accomplishing this purpose by serving as an impedance transformer between the load 37 and the wave guide 45 so as to match the impedance of the load to that of the wave guide. As indicated above with respect to Fig. 6, the variable impedance device 25 may be adjusted to have substantially any desired impedance value, by adjustment of the reflector voltage $E_R$ and the beam current $I_0$, as by means of the adjustable voltage sources 31 and 32, respectively. The resistive component $R_b$ and reactance component $X_b$ of this impedance value may be independently adjusted to have desired values. In addition, both the resistance and reactance components or either of them may be made either positive or negative, as desired. Accordingly, if the impedance value of the load 37 as seen from the wave guide 45 provides a mismatched impedance condition, which would ordinarily produce standing waves, the device 25 may be adjusted, by adjusting voltage sources 31 and 32, to modify the impedance value viewed rightward in Fig. 9 from the position of device 25, to be substantially equal to the characteristic impedance of the wave guide 45. By so doing, standing waves with their concomitant disadvantages are substantially eliminated from the wave guide 45 connected to source 36.

Figure 10:
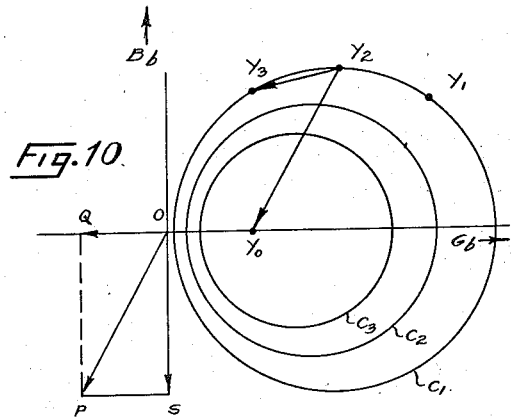
Fig. 10 is a diagram useful in explaining the operation of the circuit of Fig. 9.

As an example of how such impedance transformation may be obtained, reference is made to Fig. 10, showing an admittance diagram in which the horizontal axis represents conductance $G_b$ and the vertical axis represents susceptance $B_b$. The point $Y_0$ indicates the characteristic admittance of the wave guide section 45 to the source 36, which is assumed the same as that of the wave guide section 45' connected to the load 37. Also shown in Fig. 10 are a series of circles $C_1$, $C_2$, $C_3$ which form the well-known bipolar coordinate system having $Y_0$ and $-Y_0$ as the poles thereof.

It is a property of wave guides as well as of two-conductor transmission lines that, if a load of admittance $Y_1$ is coupled to one end of a wave guide or line of characteristic admittance $Y_0$, then the admittance as viewed from points of said wave guide spaced from the load by differing distances will be represented by points on the bipolar coordinate circle upon which the admittance $Y_1$ is located. This is shown as circle $C_1$ in Fig. 10. Accordingly, if the load 37 is assumed to have an arbitrary admittance value such as $Y_1$, then when viewed from the location of the impedance element 25, the admittance of the load 37 and its connected wave guide 45' will appear to have an admittance value such as $Y_2$, also located on circle $C_1$. Ordinarily, the section of wave guide 45' will be made relatively short. In order to match the load 37 to the wave guide 45, it is necessary that this admittance $Y_2$ be transformed to the value $Y_0$ which is the characteristic admittance of the guide 45. For this purpose, it is necessary to add to the admittance $Y_2$ an admittance shown by the vector $Y_2Y_0$ in Fig. 10, and also plotted from the origin of Fig. 10 as the vector OP.

It will be seen that this vector OP has a negative conductance OQ and a negative susceptance OS. Accordingly, the voltage sources 31 and 32 are adjusted in accordance with the considerations discussed above to cause device 25 to produce a negative conductance of amount OQ and a negative susceptance of amount OS. This negative conductance and susceptance are in shunt with the admittance $Y_2$ and therefore are added directly thereto. Accordingly, in this manner, the variable impedance device 25 transforms the admittance $Y_2$ to the admittance value $Y_0$, as is desired. It will be appreciated that for other values of admittance of the load 37, other adjustments of the variable impedance device 25 may be similarly made so as to provide proper matching or impedance transformation as desired.

The system of Fig. 9 may also be used as a phase shifter or "line stretcher." As is well known, the bipolar coordinate circles, such as $C_1$, $C_2$ of Fig. 10, form the loci of constant standing wave ratio; that is, if a circuit element of variable admittance is connected to the end of a wave guide or transmission line of characteristic admittance $Y_0$, the standing wave ratio existing in that guide or line will remain constant despite variation in the admittance of the circuit element, provided that the various admittance values of the circuit element are points of a single one of the bipolar coordinate circles shown in Fig. 10.

Thus, referring to the illustration used above, if a circuit element 37 of admittance $Y_1$ is connected at the end of the wave guide 45' having characteristic admittance $Y_0$, the resultant admittance viewed rightward from the variable impedance device 25 will have the value $Y_2$. Necessarily, the wave travelling down the wave guide 45' will have a phase shift between the positions of the device 25 and the circuit element 37, measured by the arc $Y_1Y_2$ of the circle $C_1$.

The phase of the wave arriving at the load 37 may be altered by changing the length of the wave guide section 45'. However, this is awkward and inexpedient to do mechanically, since it is of practical importance in wave guide systems to keep the elements in fixed mechanical relationship. The present invention, however, provides apparatus for producing such a phase shift of an amount which may be readily and even electronically controlled.

As discussed above, a change in the phase shift merely means (and is accompanied by) a change in the admittance value seen from the position of the device 25 to a different value on the same coordinate circle (such as $C_1$). Accordingly, additional phase shift may be interposed by transforming the admittance value $Y_2$, viewed rightward from the right of device 25, to another value, such as $Y_3$, separated from $Y_2$ along the circle $C_1$ by an arc corresponding to the desired phase shift. In the present instance, this may be done by adjusting the cricuit parameters of the variable impedance device 25 to cause it to assume an effective admittance given by the vector $Y_2, Y_3$. In this way the admittance seen from the end of wave guide 45, viewed rightward in Fig. 9, will have the new value $Y_3$, and the effect upon the load 37 in the same as though the length of the wave guide section 45' had been increased, thereby producing a relative phase shift without affecting the standing wave ratio.

The apparatus shown in Fig. 9 may also be used as a repeater or amplifier. As discussed above relative to Figs. 1 to 6, the variable impedance device 25 may be adjusted to have substantially zero susceptance (infinite reactance) and simultaneously a finite negative conductance. This corresponds to a value of $\phi$ equal to 180°. The magnitude of this negative conductance can be adjusted by varying $I_0$ under the control of $E_G$. Provided that the conductance of the load 37 viewed at the location of the variable impedance device 25 is greater in magnitude than the negative conductance of the device 25, no self-sustained oscillations will occur, but a part of the energy derived from the battery 29 will be transformed between the grids $G_1$ and $G_2$ into high frequency energy of the same frequency as source 36, thus producing an amplification or repeating action. By placing successive repeaters of this type periodically along a wave guide or other high frequency energy conductor, the high frequency energy from source 36 can be transmitted over long distances. In this way a very simple but highly effective amplifier or repeater is obtained.

In many systems it is desirable to provide a substantially non-reflecting terminating impedance or energy sink. This may be readily obtained by the use of the novel variable impedance device of the present invention. Referring to Fig. 9 once more, let it be supposed that it is desired to absorb all energy produced from the source 36 and transmitted by way of the wave guide 45. Under these circumstances, the load 37 and its connected wave guide section 45' may be completely omitted, and the variable impedance device 25 may be readily and simply adjusted to have a substantially pure conductance value, without susceptance or reactance, merely by adjusting the voltage sources 31 and 32. Such a pure conductance may be adjusted to the proper value so as to prevent reflections, and will serve to absorb all the power flow in wave guide 45.

The variable impedance device of the present invention is easily and readily adjustable to serve as such a terminating impedance for a wide variety of systems, and so avoids the difficulty of relatively narrow frequency and impedance ranges, characteristic of prior art devices.

In each of the above uses of the novel impedance element of the present invention, it is preferred to operate the device at relatively low oscillating gap voltages; that is, E should be small, preferably producing a value of $r$ less than one. This produces an advantageous type of operation in that the impedance value of the device is then substantially independent of variations in the alternating input voltage E. This will be seen from Fig. 6, where this range corresponds roughly to the portion of the curve to the left of ordinate $a$. The impedance $Z_b$ is therefore essentially a linear impedance in this range and substantially does not vary with E. Such an adjustment is most readily made by selecting or adjusting the voltage $E_0$ produced by the voltage source 29 to have a value larger (more than 10 times larger) in comparison with the maximum expected value of E. Accordingly, the bunching parameter $r$ will range in value from zero to $r=a$ in Fig. 6.

For larger values of $r$, as indicated above, the impedance $Z_b$ is non-linear with respect to E. This characteristic may serve a highly useful purpose. One such use of this characteristic is as a signal expander. For example, if the operating condition of the variable impedance device 25 is chosen in the neighborhood of the value $r=b$ (Fig. 6) by properly selecting $E_0$ in relation to E to produce $r=b'$, and with $\cos \phi$ having a negative value (by selecting $E_R$), the beam impedance $Z_b$ then exhibits a negative resistance, accordingly, the apparatus serves as an amplifier, as discussed above. For a small increase in $r$, a large increase in the negative resistance is obtained, which implies a large increase in the amplification produced by the device. For decreases in $r$ from the value $r=b$, the amplification of the device is correspondingly decreased. Therefore, the device serves as a signal expander, increasing large signals and decreasing small signals, and serves to increase the discrimination between relatively weak signals and relatively strong signals. Such a device may be useful in noise suppression, for example.

Instead of operating at the point $b$ with $\cos \phi$ negative, a similar result can be obtained by operating at point $b'$ of Fig. 6, and adjusting $E_R$ to produce positive $\cos \phi$. Here again, negative resistance and amplification exists, and a small increase in E will produce a large increase in amplification, while a decrease in E produces a decrease in amplification, so that signal expansion is produced.

As another use of the non-linear impedance characteristic of the device, it may serve as a signal limiter. Thus, in operating at $r=c$ (with positive $\cos \phi$), it will be seen that the device serves as an amplifier but that for increasing signals (increasing E), decreasing amplification is produced. For decreasing signals, increased amplification is produced. The device accordingly tends to maintain a variable amplitude input signal at a uniform level. By proper choice of the operating point $c$ along the characteristic of Fig. 6, the decrease in amplification or in negative resistance upon increase in input can be made to fully compensate for the increase in input signal to maintain substantially constant power flow and signal level in the output guide 45'. The same result may be obtained by operating at $r=c'$, with negative $\cos \phi$.

In addition to the uses enumerated above, the variable impedance device of the present invention is especially adapted for modulating the flow of energy between a source and a load or utilization device. This is illustrated in Fig. 11, which is largely similar to the system shown in Fig. 9, like elements being given the same reference character.

As has been indicated in the foregoing general discussion of the characteristics of the novel impedance device of the present invention, when a variable impedance device such as 25 is connected into an energy transmitting system such as 45, 45', the power transmitted along this system from a source 36 at one end to a load or utilization device 37 at the other end can be controlled by adjusting the operating potentials $E_0$, $E_G$ and $E_R$ of the variable impedance device 25. Accordingly, for use as an amplitude-modulating device, a modulating signal source, which may for example be a source of voice currents or other intelligence signals, is connected to vary any one or more of these voltages. For example, in one embodiment, a modulating signal source 53 may be connected in series with the voltage source 31' so as to vary the voltage between the reflector R and the gap grid $G_2$ in accordance with the modulating signals and thereby produce a correspondingly varying impedance across the wave guides 45, 45', so that amplitude modulation results. Alternatively, the modulating signal source shown at 53' may be connected in series with the control grid voltage source 32 to vary the control grid voltage by the modulating signals for producing modulation of the ultra-high-frequency energy from source 36 by the modulating signals. Also, modulation may be produced by use of the modulating signal source 53'' connected in series with the voltage source 29 to vary the beam voltage $E_0$ by the modulating signals. The modulating signal sources 53, 53', and 53'' may be used singly or in combination, according as different modulating characteristics are desired. It is preferred to use the modulating signal source 53, since here a lower amplitude of modulating signal and lower power output from the modulating signal source is required to produce a given intensity of modulation.

Figure 12:
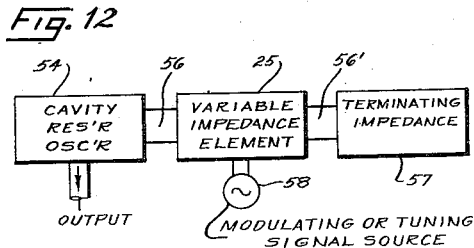
Fig. 12 is a schematic block diagram of another system using the variable impedance element of the present invention as a tuning control or frequency modulator.

The variable impedance device of the present invention is also useful as a tuning control, as illustrated in the block diagram Fig. 12. In this figure there is schematically illustrated an ultra-high-frequency oscillator 54 having a cavity resonator as the tank circuit or frequency-determining element thereof. Coupled to the resonator by a suitable high frequency energy conductor 56, preferably of the wave guide or coaxial line type, is the variable impedance device 25, similar to those shown in Figs. 7, 8 or 8A. Also coupled to the variable impedance device 25 by a further conductor 56' is a suitable non-reflecting terminating impedance 57 of any conventional type adapted to absorb all high frequency energy incident thereon so that no reflections or standing waves are produced. This terminating impedance may be another variable impedance element according to the present invention, as described above. As discussed above in the general discussion of the characteristics of my variable impedance device, this device 25 may be adjusted to have widely varying pure reactance, either negative or positive in character; that is, either inductive or capacitive reactance. When such a reactive impedance is coupled to a resonator, such as that of oscillator 54, a change in the resonant frequency of that resonator occurs. Such change in resonant frequency necessarily produces a change in the output frequency of the oscillator. The reactance of the variable impedance element 25 is readily adjusted under the control of the variable voltage sources 31 and 32 connected to variable impedance device 25 as shown in prior figures. Accordingly, this apparatus produces a readily adjustable oscillator frequency which is variable over a wide range and can be adjusted manually by manually adjusting the impedance-controlling voltages $E_G$, $E_0$, and $E_R$, or automatically by controlling any one or more of the voltages by signals derived in response to the frequency condition of oscillator 54, in any conventional manner known in the automatic frequency control art.

Figure 11:
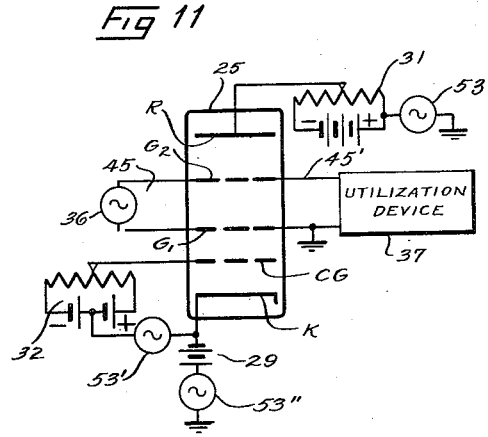
Fig. 11 is a schematic circuit diagram of the variable impedance element of the present invention used as an amplitude modulator or adjuster.

Frequency modulation of the output of the oscillator 54 can also be readily produced by connecting a modulating signal source shown at 58 in the circuit of the variable impedance device 25 in any of the ways illustrated in Fig. 11.

Figure 13:
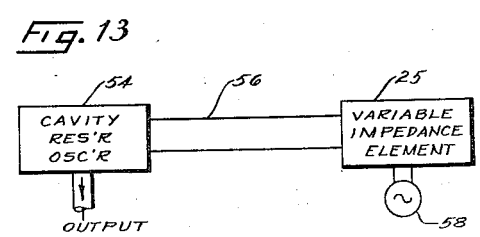
Fig. 13 is a similar schematic block diagram of a modification of Fig. 12.

If desired, the non-reflecting termination 57 and its connecting conductor 56' of Fig. 12 may be omitted, as illustrated in Fig. 13.

In each of Figs. 12 and 13, where the variable impedance element 25 is used for tuning or frequency modulating the output of an oscillator, it is mainly the variable reactance qualities of the variable impedance device which are used. Accordingly, a highly useful operating condition is that for which the resistance $R_b$ is infinite or conductance $G_b$ is zero. For this condition, $\phi$ is adjusted to make the reactance a maximum, and the Q of the resonator to which the device 25 is coupled is not lowered. The magnitude of the reactance is then readily adjustable by varying $E_G$ to vary $I_0$. The polarity of the reactance can be reversed by altering $\phi$ by 180°, as by resetting the value of $E_R$. Ordinarily, in this type of operation it is most desirable to have a small ratio of E to $E_0$.

This method of tuning or modulating is especially advantageous in those ultra-high-frequency oscillators where it is ordinarily impracticable to vary the resonant frequency of the resonator by mechanical distortion or alteration of the shape of the resonator. Magnetron oscillators of all types form one class of such oscillators for which the present invention has especially high utility.

Figure 13A:
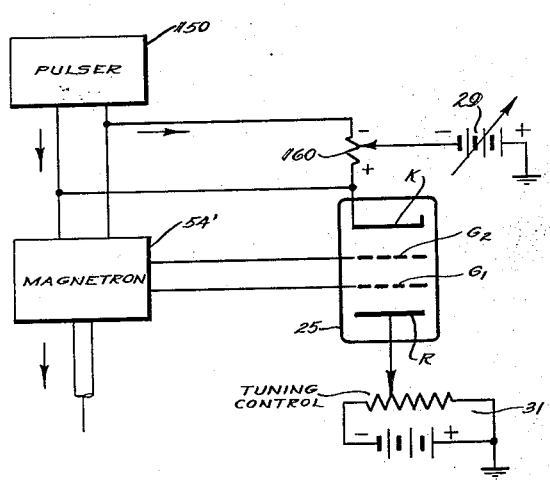
Fig. 13A is a similar circuit diagram of a further modification of Figs. 12 and 13 useful with a pulsed oscillation generator.

In many types of radar systems, such magnetron devices are used to generate periodic high intensity pulses of radiation. Such a system is illustrated in Fig. 13A where the magnetron oscillator 54' is controlled by the pulser 150. The resultant high intensity pulses produce a very high voltage between grids $G_1$, $G_2$ of the variable impedance element 25. To maintain a suitable value of bunching parameter $r$ at a useful value, the beam voltage $E_0$ of the variable impedance device is pulsed in synchronism with the magnetron pulsing. Thus, the pulser 150 has its output supplied to unadjustable voltage divider 160, whose output in turn is connected in series with cathode K and the beam voltage source 29. In this way, the beam voltage is maintained small for small or zero magnetron output, but is greatly increased as the magnetron output (and consequently E) is pulsed on. In this way, $r$ can be maintained constant despite variation in E. Tuning is accomplished by varying the reflector voltage source 31 or the beam voltage source 29. Modulation may be effected by connecting modulating signals in series with reflector R or cathode K. Control grid CG may be used, if desired, in the manner described hereinabove.

Figure 13B:
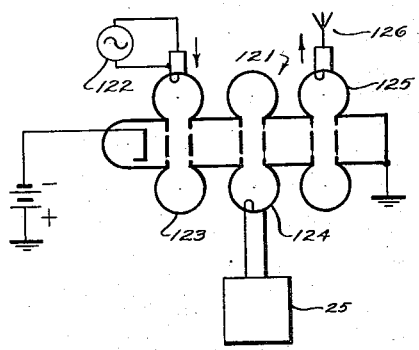
Figs. 13B and 13C are schematic circuit diagrams of systems utilizing the present novel variable impedance element for amplitude modulation.

The present method of tuning or modulating is especially advantageous when used with velocity modulation or klystron devices. Fig. 13B shows how this method is applied to a cascade amplifier klystron 121, such as of the 2K35 type, shown schematically in this figure. In such a klystron amplifier, the input signal from a source 122 is coupled to an input resonator 123. A second resonator 124 serves to amplify the signal, and an output is derived from a third or output resonator 125 and is supplied to a suitable load, such as radiator 126. An electron beam is projected successively through the three resonators to provide amplification.

In such an amplifier, the output amplitude is a function of the resonant frequency of the second resonator 124. According to the present invention, the variable impedance element 25 is coupled to this second resonator 124. Thus, by adjusting the potentials applied to impedance element 25, or by varying these potentials in accordance with modulatnig signals, the output from the amplifier 121 is correspondingly adjusted or amplitude-modulated.

However, when the resonant frequency of the amplifier resonator is varied, the relative phase of the oscillation within the resonator to the resonant-frequency component of the bunched electron beam current is varied, resulting in a slight amount of phase modulation in addition to the amplitude modulation. To obtain absolutely pure amplitude modulation, the resonant frequency of the amplifier resonator is left unchanged, but its Q is varied in accordance with the control or modulating signal, by controlling the variable-impedance device by that signal and producing a resultant impedance value which reflects into the amplifier resonator as a pure resistance, following the theoretical consideration discussed above. It will be understood that if the output cavity resonator of an amplifier is detuned, the amplitude of response goes down; but the relative phase of the bunched beam current and the output resonator voltage is also changed, so that the amplitude modulation produced by varying the resonant frequency of the output resonator is accompanied by a type of phase modulation. However, if the resonant frequency is kept fixed, and only the Q is changed, pure amplitude modulation is obtained unaccompanied by phase or frequency modulation.

Figure 13C:
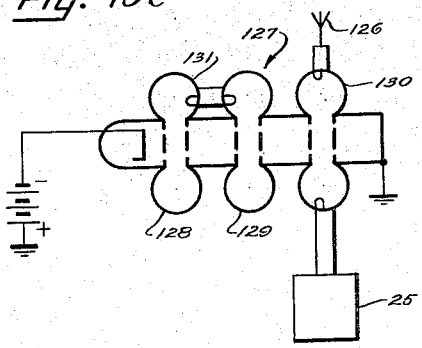

Another way to obtain pure amplitude modulation or adjustment is illustrated schematically in Fig. 13C, which shows an oscillator-buffer klystron 127, such as of the 2K34 type. Such klystrons also include three resonators 128, 129, 130; the first two being coupled by a feedback connection 131 and forming an oscillator section. The last resonator 130 is an output or buffer resonator, coupled to the load 126. Output resonator 130 is thus only electronically coupled to the oscillator section, and its loading does not affect the output frequency. However, the output amplitude depends on the tuning of resonator 130, which may be varied or modulated by the variable impedance element 25 coupled thereto. Again, pure amplitude adjustment or modulation is produced by adjusting the potentials applied to impedance element 25 or by varying these potentials by modulating signals.

Figure 14:
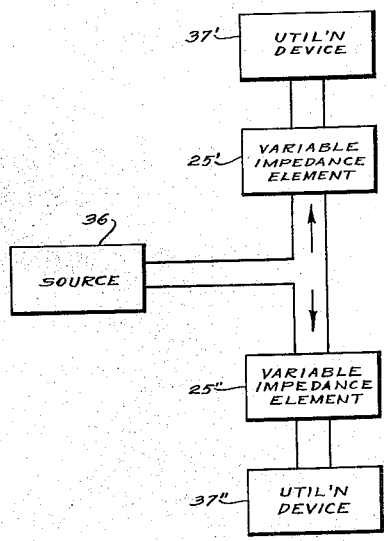
Fig. 14 is a schematic block diagram of a system utilizing the present novel variable impedance element as a power divider or monitor.

A further use of the variable impedance element of the present invention is as a power divider. This is illustrated in Fig. 14. As discussed relative to Figs. 9 and 11, the variable impedance element 25, when interposed between a source 36 and a load or utilization device such as 37, can serve to control the power flow between the source and the load, by varying the impedance match between source and load. In Fig. 14 a single source 36 feeds two separate loads 37' and 37''. Interposed between the source 36 and each of the loads 37', 37'' is a respective variable impedance element 25' and 25'' of the type discussed above. By adjustment of the voltages applied to the respective electrodes of these impedance elements 25' and 25'', the amount of power delivered by the source 36 to the loads 37' and 37'' can be individually controlled. For example, by such adjustment a fixed percentage of the power output from source 36 may be supplied to load 37', the remainder going to load 37''.

One application of this system of Fig. 14 might be in monitoring the power flow from a source 36 to a useful load 37', in which case the other load 37'' might be a wattmeter or other power-indicating device. The variable impedance elements 25' and 25'' are then adjusted so that a small fixed percentage of the power flowing from source 36 will flow to the monitoring device 37'', the remainder flowing to the useful load 37'.

As a further type of system similar to Fig. 14, the two loads 37' and 37'' could be a pair of directive antenna structures producing overlapping radiation patterns. The variable impedance elements 25' and 25'' would then be modulated by suitable square-wave signals of respectively opposite phase, and of respective amplitudes so that for one half-cycle of these signals one of the impedance elements is thrown into a condition permitting free passage of energy from the source 36 to its corresponding antenna while the other is put in a condition completely blocking such energy flow to the other antenna. For the next half-cycle, energy flows to the other antenna, and not to the first antenna. In this way the two antenna loads 37', 37'' would be alternately energized, producing alternate overlapping radiant energy beams which may serve to define a course for guidance of aircraft or other vessels by their interaction or equi-intensity axis.

Figure 15:
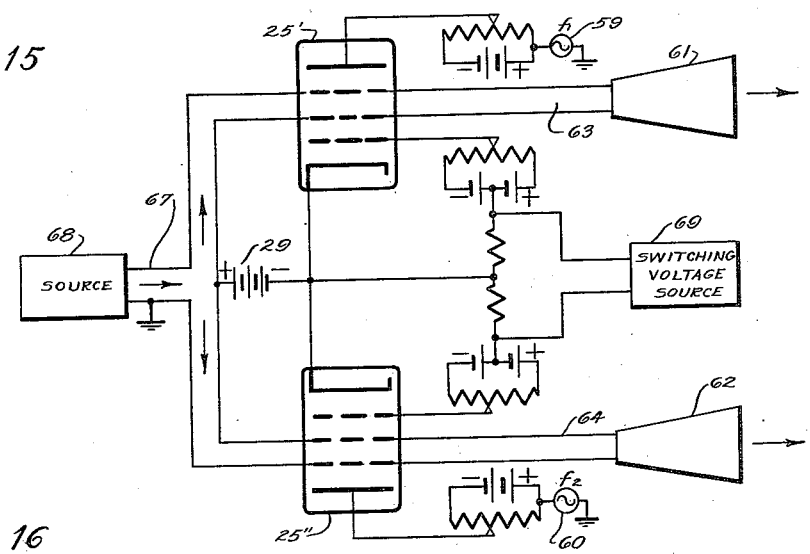
Fig. 15 is a schematic circuit diagram of a system utilizing the present novel variable impedance element as a lobe-switching arrangement for radio navigation.

This is illustrated in Fig. 15, wherein two directive antennae 61 and 62 are shown having slightly overlapping, highly directive, radiation patterns. These antennae are illustrated as being electromagnetic horns, but any other types of antenna may be used. Each of these antennae 61, 62 is fed by a respective ultra-high-frequency conductor 63, 64, in which are incorporated respective variable impedance elements 25' and 25'' similar to those discussed above. The conductors 63 and 64 are joined to a common ultra-high-frequency conductor 67 and thereby to a source 68 of ultra-high-frequency energy to be radiated from the antennae 61 and 62. The energy is alternately emitted from the respective antennae 61 and 62 under the control of a switching voltage source 69, which preferably produces a square-wave output. As shown by way of illustration in Fig. 15, this switching voltage source 69 is coupled in opposite phase to the respective control grids of the impedance elements 25' and 25'' and thereby serves to alternately block and unlock the conductors 63 and 64 in opposite phase so as to alternate the energization of the antennae 61 and 62.

If desired, the radiation from each of the two overlapping-pattern antennae 61, 62 can be separately identified by impressing separate modulating signals thereon. The system of Fig. 15 readily and conveniently permits such additional modulation. Thus, as shown in this figure, separate modulating sources 59, 60, of respective modulating frequencies $f_1$, $f_2$, may be connected in series with the respective adjustable reflector voltage sources of impedance elements 25', 25'', so as to modulate the energies transmitted along conductors 63, 64 and radiated from antennae 61, 62 by these respective modulating frequencies $f_1$ and $f_2$, and thereby to identify the respective radiated beams. In this way separate, alternate, overlapping and separately identifiable radiation patterns are produced, which are highly useful in the radio guidance of vehicles. By the use of sine wave output from source 69, the antenna radiation pattern can be smoothly scanned between two extreme positions.

Figure 16:
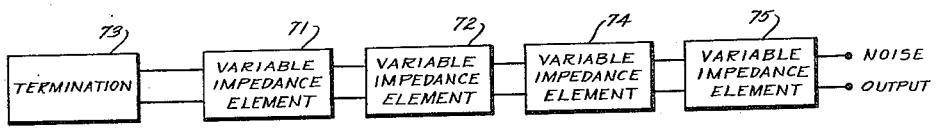
Fig. 16 is a schematic block diagram of a system utilizing the present novel variable impedance element as a noise source in the ultra-high and super-high frequency range.

As a still further application of the novel variable impedance element of the present invention, it may be utilized as an extremely wideband noise voltage source. This is illustrated in Fig. 16. In calibrating receivers of ultra-high frequencies, an important characteristic determining the usefulness and efficiency of such receivers is the lowest signal level which can be received in comparison to the noise level. Accordingly, standard noise sources are required for measuring such signal level. In any electron discharge amplifier device, noise voltages are produced, due in large measure to the so-called "shot" effect. In ordinary operation, when an input signal is applied to the amplifier device, the noise voltages, being of relatively low amplitude compared to the useful signal, are negligible. However, when no input signal is fed to an amplifier of high amplification factor, substantial noise voltage is produced. In the noise sources in general use for ultra-high frequencies, only a relatively narrow band of frequencies of noise can be produced in view of the fact that all such known noise sources utilize resonant circuits which necessarily limit the band-width of noise voltages produced. The present invention provides a highly useful noise source which has a frequency spectrum or band-width of a markedly higher order of magnitude than those previously known. For example, noise voltages in the frequency range from 300 to 30,000 megacycles per second (one meter to one centimeter in wavelength) may be simultaneously produced.

As indicated above in the discussion of the general characteristics of my novel impedance element, this impedance element has negative resistance (and accordingly serves as an amplifier) for those values of $\phi$ for which $\cos\phi$ is negative. Stated in other words, such negative resistance is produced for an electron transit time N of value between $p$ and $p-\frac{1}{2}$, where $p$ is any positive integer. Accordingly, amplified noise voltages will be produced by such a device in the frequency ranges for which the particular electron transit time of the device corresponds to the interval between an integral number $p$ of cycles of that frequency and $p-\frac{1}{2}$.

Figure 17:
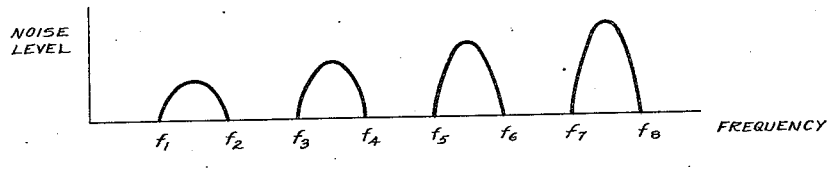
Fig. 17 is a graph useful in explaining the operation of the device of Fig. 16.

This is schematically illustrated in Fig. 17, in which noise level is plotted against frequency. For a particular transit time T, there will be a frequency $f_1$ for which this transit time is a half-cycle. Frequency $f_2$ is the frequency for which this same transit time T corresponds to one full cycle. Between frequencies $f_1$ and $f_2$ the variable impedance element serves as an amplifier and has negative resistance, and accordingly produces noise voltages which are distributed throughout the frequency range $f_1$ to $f_2$. The frequency $f_1$ is the lowest frequency component of the noise signals produced. Similarly, frequency $f_3$ represents the frequency at which the given transit time T corresponds to $\frac{3}{2}$ cycles, and the frequency $f_4$ is that for which the transit time T is two cycles. Between $f_3$ and $f_4$ noise voltages will be produced. Similarly, $f_5$ and $f_6$ are the frequencies at which the transit time T corresponds to $\frac{5}{2}$ and three cycles, respectively, and between which more noise voltages are produced. There are similar further ranges of noise frequencies up to a limiting frequency at which the efficiency of the device falls off to such an extent that the noise voltages are insignificant. No difficulty exists in producing such noise voltages over at least 20 such frequency ranges, covering the range of 300 to 12,000 megacycles per second, for example.

Accordingly, it will be seen that the device of the present invention produces a series of equally separated frequency spectra in which noise is produced. A second variable impedance element can also be included, having a different transit time T' such that $f_2$ corresponds to one-half cycle of this transit time, and $f_4$ corresponds to one full cycle. This second device will have a similar noise spectrum, but displaced relative to that of the first device, and will thereby serve to supply noise frequency values intermediate those shown in Fig. 17.

Fig. 16 shows a system adapted to produce such noise signals. In this figure, the variable impedance element 71, of the same type as discussed above, having an electron transit time T in the reflector field space, serves to produce the noise spectrum shown in Fig. 17. The variable impedance element 72, which may be located closely adjacent the element 71, is provided with a different transit time T', and accordingly produces a frequency spectrum similar to Fig. 17, but displaced, with respect thereto, and thus supplies other frequency components absent from the output of the element 71. Element 72 also serves to amplify some of the noise components produced by element 71. A non-reflecting termination 73 may be coupled to the other side of element 71 to prevent standing waves by reflection, if so desired, although this termination 73 may be omitted.

Further variable impedance elements 74, 75, etc., may be cascaded in the system to serve as other noise sources or as amplifiers or repeaters and to increase the level of the noise signal to a useful output level. At the same time these further elements 74, 75, etc., may be adjusted to add other frequency components to the noise signal, where desired. The output derived from these devices will accordingly have noise frequency components spread over an exceedingly wide frequency band, many octaves in extent, in marked comparison to prior art devices in which the frequency band-width is of the order of a few per cents of the center frequency.

Figure 18:
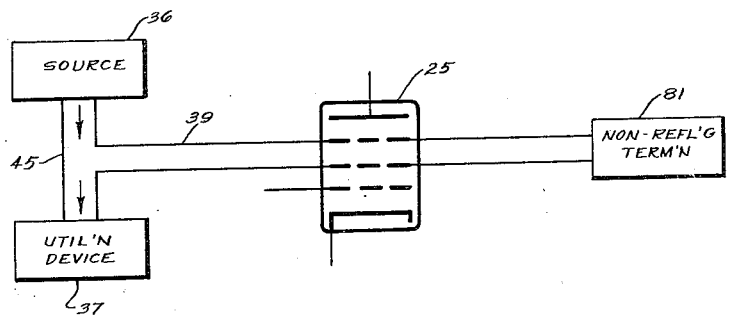
Fig. 18 is a schematic circuit diagram of a modification of any of the preceding figures.

In all of the above-discussed applications of the present invention, such as in Figs. 7 through 17, the variable impedance element of the invention is shown as incorporated directly in the wave guide through which ultra-high-frequency power flows. However, this is not an essential condition. On the contrary, in any of these systems, the variable impedance element may be connected in shunt with the main wave guide or other high frequency energy conductor, and still serve equally well. This is illustrated in Fig. 18, which shows a general system similar to those of the above figures. Here the energy from the source 36 flows to the utilization device 37 through the ultra-high-frequency energy conductor 45, which may be a wave guide or a coaxial line or a parallel-wire transmission line. The variable impedance element 25 is coupled to this main conductor 45 by a suitable connecting conductor 39 connected in shunt to conductor 45. The circuit of element 25 may be any of those described above. In this way any impedance variation of the variable impedance element 25 is reflected through the connecting conductor 39 to appear in shunt with the conductor 45, and produces a result substantially the same as though the element 25 were directly incorporated in the conductor 45 in the manner shown in the preceding figures. A non-reflecting termination 81 of any suitable type may be coupled at the other side of the element 25 to prevent the appearance of standing waves at the location of the element 25 which might disturb the operating characteristics of the element 25.

Figure 19:
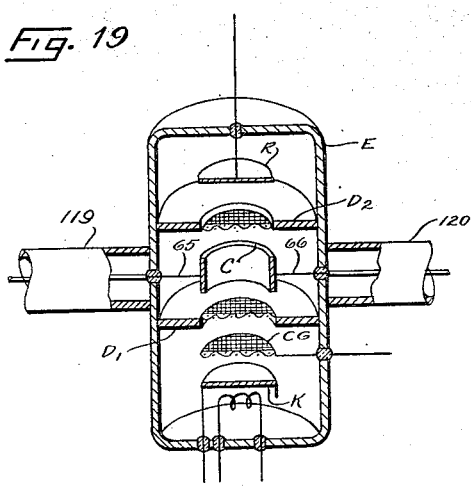
Fig. 19 is a perspective view, partly in cross-section, of a modification of the devices of Figs. 7, 8 and 8A, and useful with coaxial line systems.

In the embodiments of the invention and their applications described above, the variable impedance elements 25 have been shown as utilized directly with wave guides. Of course, they can equally well be utilized with any other types of high frequency conductor systems. Fig. 19 shows an embodiment of a variable frequency element particularly adapted for use with coaxial lines or with other high frequency conductors having one grounded terminal.

In this figure, the heater H, cathode K, control grid CG and reflector R are the same as in previously described embodiments. The envelope E of the device is is preferably of metal construction conventional in the electron discharge art, the various electrodes being connected to lead-in terminals passing through small insulating seals in the envelope.

The device of Fig. 19 differs from those described in Figs. 7 and 8 in that the grids $G_1$ and $G_2$ forming the gap are replaced by a pair of diaphragms $D_1$, $D_2$ connected to the inner metallic wall of the envelope E. Diaphragms $D_1$ and $D_2$ are centrally apertured for passage of the electron stream, having either a single opening or a grid-like structure at the centers thereof. Mounted between diaphragms $D_1$, $D_2$ and insulated therefrom is a cylinder C surrounding the electron beam path. Cylinder C may be provided with grids across its ends, if desired. The diaphragms $D_1$ and $D_2$ together with cylinder C form two gaps, separated by the length of cylinder C. This cylinder C is preferably selected to have a length substantially equal to the distance traversed by the electrons in one-half period of the operating frequency, so that the electrons experience similar action at the two gaps. Cylinder C is connected to two lead-ins 65, 66 passing through insulating seals in the envelope E, and is thereby connected to the inner conductors of respective input and output coaxial lines 119 and 120, whose outer conductors are connected to the metal envelope E. These lines 119 and 120 serve the same purpose as wave guides 45 and 45' in Figs. 8 and 9. The apparatus of Fig. 19 may thus be connected in any of the systems described above, and will operate in the same manner as the devices of Fig. 8 or 9.

In the embodiments of the invention and their applications described above, the variable impedance elements of the present invention have been utilized directly in conjunction with ultra-high-frequency energy conductors of various types and have been shown to provide variable impedance characteristics highly useful in numerous different ways. However, the present invention is not restricted to the use of the impedance element in conductors. The variable impedance element described above may also be used in conjunction with a resonant circuit, preferably of the cavity or hollow resonator type.

This is illustrated in Fig. 20, where an impedance element 25 of essentially the same construction as that shown in Fig. 7 is illustrated in conjunction with a cavity resonator 21. The cavity resonator 21 is formed of a pair of cylindrical conductive members 76 and 77, respectively engaging the grid-supporting plates 41 and 42 at one end. This engagement is preferably frictional so as to permit replacement of resonator 21 by other resonators of different characteristics where desired. The cylinders 76 and 77 are joined at their other ends by a closure member 78 to complete the enclosure of the resonator space, which is accordingly that space included between cylinders 76 and 77 and between plates 41 and 42.

It will therefore be seen that the resonator 21 is essentially cylindrical in shape but of re-entrant configuration, and having the electron stream from the cathode K projected across the re-entrant portion by way of narrow gap between the grids $G_1$ and $G_2$. The circuit and voltage sources associated with the impedance element 25 of Fig. 20 are the same as those shown in Fig. 9 or 11.

If desired, the impedance element 25 may be integrally incorporated with the resonator to form a unitary device. This is illustrated in Fig. 21, where the grid $G_2$ is supported in the end wall 82 of the resonator 21'. Resonator 21' also has a cylindrical side wall 83 and a flat end wall 84, in which is mounted a re-entrant inner cylindrical wall 85 supporting the second grid $G_1$. Cathode K, control grid CG and reflector R are aligned with the gap grids $G_1$ and $G_2$ as in the preceding forms of the invention. Reflector R may be supported by an insulating or metallic end bell 86 sealed to the wall 82. If a metallic end bell 86 is employed, means must be provided for insulating the reflector R from grids $G_1$ and $G_2$. Similarly, the cathode K and control grid CG may be supported by a further insulating or metallic end bell 87 sealed to the other resonator end wall 84. If a metallic end bell 86 is employed, means must be provided for insulating the cathode K and control grid CG from the grids $G_1$ and $G_2$. Coupling to the resonator 21' is effected by a pair of coupling loops 88 and 89 connected to respective coaxial line terminals 90 and 91. Vacuum-tight seals 92 and 93 between the inner and outer conductors of the coaxial terminals 90 and 91 maintain the resonator space vacuum-tight for passage of the electron stream. Similar coaxial line terminals 79 and 80 are provided in the device of Fig. 20.

The devices of Fig. 20 and Fig. 21 are useful in the same manner as discussed above with respect to the impedance element of Figs. 8, 7 and 8A, the major difference being that the impedance value offered by the devices of Figs. 20 and 21 now consists of the combined impedance of the electron stream and of the resonant circuit of the resonator, the electron stream being effectively connected in parallel with the resonant circuit so that the admittance value of the stream is added directly to the admittance value of the resonator.

This situation permits the combined resonator and impedance element of Figs. 20 and 21 to be used in exactly the same manner as discussed above, the resonator then being normally tuned to the operating frequency. However, one precaution must be taken, similar to that noted above. If the electron beam conductance $G_b$ provided by the variable impedance element 25 is negative and has a magnitude greater than the conductance of the resonator 21 or 21' combined with the conductance of any load connected thereto (such as the utilization device 37) self-sustained oscillations will be produced in the resonator 21, even though source 36 were disconnected. Such oscillations are undesired when using the device as a variable impedance element or in any of the uses enumerated above. Accordingly, in the use of the device of Figs. 20 and 21, the beam conductance, if negative, is always maintained at a magnitude less than that of the impedance of the resonator and load combined. Of course, if the beam conductance is positive, no difficulty of this type is experienced. This condition is maintained by the proper adjustment of the reflector potential $E_R$ or the control grid potential $E_G$ or by proper selection of the impedance of the load 37 in relation to the other parameters of the system in the manner discussed above. This condition is termed a "passive" state, since the variable impedance element then cannot oscillate.

The impedance elements of Figs. 20 and 21, using a cavity resonator, may be used exactly as the impedance elements of Figs. 7–19 are used, and may be substituted therefor in any of these figures by merely using the proper type of couplings. In addition, it is useful in other applications, described hereinbelow.

The operation of the type of device shown in Figs. 20 and 21 may be better understood from the following analysis. Assuming that source 36 is coupled to the resonator 21 through the terminal 79, an alternating voltage $e$ will appear between grids $G_1$ and $G_2$. While the electron beam from the cathode K is not flowing (as when the device is disconnected from its voltage sources), the power dissipated in the resonator 21 and its coupled load 37 is given by $$P_d = \tfrac{1}{2} E^2 / R' \qquad (11)$$

where $R'$ is the effective impedance of the resonator 21 in shunt with that of the load 37.

Substituting the value of E derived from the definition of the bunching parameter $r$, the dissipated power may be expressed as follows:

$$P_d = \frac{1}{2R'} \left( \frac{rE_0}{\pi Nm} \right)^2 \qquad (12)$$

A new parameter $y$ may be defined as follows:

$$y = \pi N m^2 R' / R_0 \qquad (13)$$

It will be seen that this parameter $y$ is a circuit parameter depending only upon the circuit constants and undirectional potentials applied to the apparatus, and independent of the input voltage E. Equation 12 then takes on the form $$P_d = \frac{1}{2} \frac{I_0 E_0}{\pi N} \frac{r^2}{y} \qquad (14)$$

As shown above, the power delivered to the electron beam (now assumed flowing) from the source 36 may be expressed as follows:

$$P_b = I_0 m E J_1(r) \cos \phi \qquad (15)$$

Accordingly, the total power P delivered from the source 36 is the sum of $P_b$ and $P_d$ and is given by $$P = \frac{I_0 E_0}{\pi N} \left( \frac{1}{2} \frac{r^2}{y} + r J_1(r) \cos \phi \right) \qquad (16)$$

Certain of the characteristics of the present apparatus, derived from Equation 16, are shown in Figs. 22 through 25. These figures show the curves of total power P delivered by the source 36 plotted against the bunching parameter $r$. Fig. 22 shows two curves for a small value of circuit parameter $y$, curve $a$ being for a positive value of $\cos \phi$, while curve $b$ is the corresponding curve for a negative value of $\cos \phi$. Fig. 23 similarly shows curves $c$ and $d$ for a large value of $y$, curve $c$ being for a positive value of $\cos \phi$ and curve $d$ for a negative value of $\cos \phi$.

In Fig. 24 are shown curves of $R''$ versus $r$, $R''$ being the total combined resistance of the resonator, load and electron beam. These curves are plotted for the same conditions as in Fig. 22, curves $a'$ and $b'$ corresponding to curves $a$ and $b$ thereof, respectively. Similarly, Fig. 25 shows curves of $R''$ plotted against $r$ for the same conditions as in Fig. 23.

Referring to Equation 2, it will be seen that, by maintaining everything constant except E, $r$ will vary in proportion to E. The first term of the right side of Equation 16 is therefore essentially parabolic, increasing with increasing $r$ or E. The second component is an alternating function of increasing amplitude, since the Bessel function $J_1(r)$ has successive zeros approximately spaced by the interval $\pi$. At the first zero for $r$, equal approximately to 3.83, the total power dissipated is given by the first term. This value is shown at the vertical line $z_1$, where the R. F. beam current component at the input frequency is zero, so that the beam does not either absorb power from the resonator, or deliver power thereto. At this point, therefore, the total effective load on the source is merely $R'$, defined by the resonator losses and the load 37. The same is true at the second zero of $J_1(r)$, at approximately $r = 7.02$, shown at line $z_2$.

Where $y$ is small, as in Figs. 22 and 24, power is always absorbed by the beam from source 37. Where $y$ is large (as shown in Figs. 23 and 25) so that the loading by the electron beam $P_b$ is an appreciable part of the total power P dissipated $P_b$ may be positive or negative, according as $\cos \phi$ is negative or positive, respectively. As shown in Figs. 23 and 25, in the range where $r$ is between zero and $x_3$, for $\cos \phi$ negative (where $\phi$ is between $\pi/2$ and $3\pi/2$, $R''$ and P are negative (curves $d$ and $d'$). This means that impedance element 25 oscillates of itself, and therefore serves as an oscillation generator, which is an undesired type of operation under the present invention. It is to be noted that, by increasing $r$ above $x_3$ (as by applying energy from source 36 to the resonator 21 to produce a voltage E greater than that required for $r = x_3$), oscillations may be stopped. The value of $r$ may also be increased above $x_3$, so as to stop oscillations, by increasing N, as by decreasing the reflector voltage $E_R$ or by decreasing the beam voltage $E_0$.

As is also shown in Figs. 23 and 25, for $r$ between the values $x_1$ and $x_2$, and for positive $\cos \phi$, $R''$ is negative and P is negative (curves $c$ and $c'$). This means that the impedance element 25 oscillates of itself and produces power rather than absorbs power from source 36. However, these oscillations are not self-starting; i. e., the voltage E cannot build itself up from zero to a stable oscillation value, as in the case described in the preceding paragraph. Once $r$ is increased to the value $x_1$, oscillations will start, but not before. Also, if $r$ is increased beyond $x_2$, oscillations will stop.

This characteristic of the present device may be useful to provide a monitor or "memory" of the power level of the oscillator 36 or other source connected in its place. Thus, suppose the device is connected in a system where normally E is of such a value that $r$ is less than $x_3$. The impedance element then remains passive, or non-oscillating. Should E increase $r$ to a value above $x_3$, for any reason, the variable impedance device will start oscillating and will remain oscillating. Its oscillation is therefore an indication that E is increased above the critical value. The sustained character of the oscillation gives a continual indication thereafter of the previous increase in E, even though that increase may have been only momentary. In this way the device "remembers" the previous occurrence.

These characteristics of the device of the present invention may also be understood from another viewpoint, illustrated by Fig. 26, which shows an equivalent circuit diagram of the resonator 21, and its circuit. In Fig. 26, the resonator 21 is represented schematically by the parallel resonant circuit formed by capacitance C and inductance L connected across source 36. The losses in the resonator are represented by the shunt resistor $R_r$. Connected in parallel with the resonator 21 is the impedance $Z_L$ of load 37. The parallel connection of $R_r$ and $Z_L$ produces a resultant impedance $R'$, in the notation used above.

As shown above, the effect of turning on the electron stream in the apparatus is the same as connecting an impedance $Z_b$ in parallel with the resonator 21. This alternating current beam impedance may be considered as parallel-connected resistance $R_b$ and reactance $X_b$, given by Equations 6 and 7 above.

By virtue of the conjunction of the resonator 21 or 21' with the variable impedance element 25 provided by the electron-discharge portion of the apparatus, further uses are possible in addition to those discussed above. In normal operation, a cavity resonator, such as 21 or 21', has a definite resonant frequency and a definite merit factor Q (usually defined as the ratio of stored energy to energy dissipated per cycle). The device of the present invention illustrated in Figs. 20 and 21 permits accurate and easy control of either or both of these factors.

Figure 27:
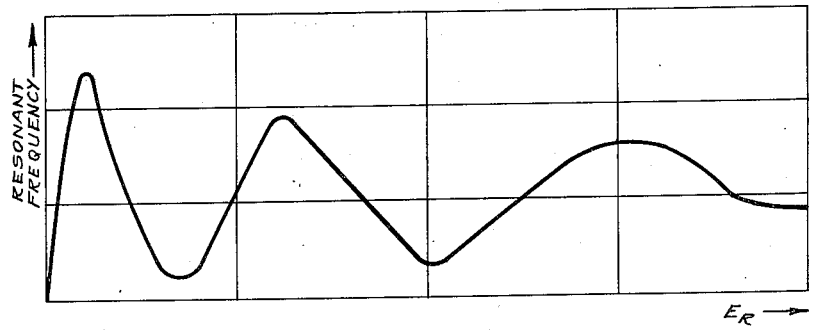
Figs. 27–29 are curves and graphs useful in explaining the operation of the devices of Figs. 20 and 21.
Figure 28:
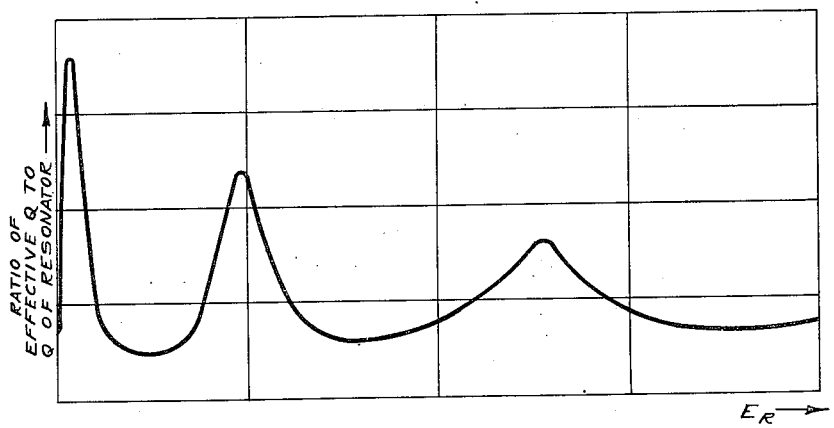

It will be appreciated that the effective reactance $X_b$ exhibited by the electron stream is connected in shunt with the resonator, as shown in Fig. 26. Accordingly, the resultant resonant frequency of the entire device including the resonator and the electron stream, will vary as the beam reactance $X_b$ is varied. Similarly, the energy dissipated in the resonator device may be readily varied by varying the effective beam resistance $R_b$ connected effectively in shunt with the resonator, as illustrated in Fig. 26. In this way the Q of the device can be adjusted. Figs. 27 and 28 are experimental curves showing the variation of resonant frequency and of Q, respectively, with variation in the phase $\phi$ (produced by varying $E_R$), for a fixed value of input voltage E and fixed $E_0$ and $E_G$. Accordingly, this apparatus can be utilized, for example, wherever a variably tuned cavity resonator is required.

In addition to permitting variable tuning over a wide range of resonant frequencies, the Q of the resonator, which is a measure of selectivity, can also be independently controlled. One such use for such a device would be in a multichannel receiver. Here the resonant frequency of the cavity resonator (which might be coupled directly to a receiving antenna serving as the source 36 of the previous figures) can be shifted in tuning from one channel to another merely by changing the operating voltages, preferably $E_G$ and/or $E_R$. Thus, a simple switch might be provided changing the voltage $E_R$ in steps, each position of the switch then corresponding to a single channel. Alternatively, the tuning of the resonator device may be effected in response to the frequency of the incoming wave, by a suitable automatic frequency control circuit, so as to maintain the tuned circuit 21 or 21' in resonance with the incoming frequency. At the same time the selectivity can be independently controlled. As shown in Fig. 28, a wide range of Q, and hence of selectivity control, can be obtained. In addition, by proper adjustment of $I_0$ to a value which completely prevents any oscillations whatever (that is, to a value below the starting current necessary for a reflex oscillator) the Q can be made theoretically infinite when operating with input voltages producing a value of $r$ in the neighborhood of 3.83, as shown in Fig. 6.

The present invention also provides apparatus automatically variable in Q as the signal level changes. For example, when the signal level decreases, it is advantageous to increase the Q in order to discriminate more strongly against noise voltages, and when the signal level is high, lower Q and broader selectivity may be desirable.

These features may be obtained, according to the present invention, by adjusting the operating point of the variable impedance element of Fig. 20 or 21 to a condition such as at $c$ in Fig. 6. For this condition, an increase in E produces an increase in $r$ which causes a decrease in the magnitude of the negative resistance and hence a decrease in Q. Conversely, a decrease in E produces an increase in Q.

Figure 29:
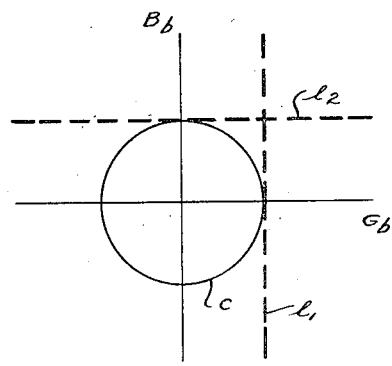

It is also possible to vary the resonant frequency substantially without change in Q, that is, to produce a variable frequency constant Q circuit, which is highly advantageous in filter work. This is illustrated in Fig. 29, which shows an admittance plot in which the ordinate axis represents susceptance $B_b$ of the beam and the abscissa axis represents beam conductance $G_b$. As indicated above relative to Fig. 5, for a constant value of $I_0$ and variable $\phi$, the admittance values of the beam have a locus along a circle with the center at the origin. Such a circle is shown at $c$ in Fig. 29. To produce variable resonant frequency for a resonator incorporating the present variable impedance element, it is necessary for the susceptance $B_b$ to vary over a wide range. Accordingly, for variable-frequency constant-Q operation, the admittance $Y_b$ of the electron beam should vary along the line $l_1$. This can be readily obtained according to the present invention. As noted above, for a change in $\phi$, both $B_b$ and $G_b$ change. By simultaneously adjusting $I_0$ by control of $E_G$, the value of $G_b$ can be kept substantially constant while $B_b$ varies widely, thereby producing the locus $l_1$ as desired. This, of course, requires simultaneous control of both $E_G$ and $E_R$ in non-linear fashion. Such control can be obtained in conventional manner by suitably designed non-linear ganged voltage dividers or by suitably designed ganged cams operating linear voltage dividers, such as in the voltage sources 31 and 32.

Another type of operation possible with the present device is as a constant-frequency variable-selectivity tuned circuit. Such a circuit is almost impossible of attainment at ordinary frequencies or with ordinary devices, but is readily provided by the present invention. As illustrated also in Fig. 29, for constant frequency operation, the susceptance $B_b$ of the beam must be maintained constant while the conductance $G_b$ varies to produce variable Q. Accordingly, the locus of beam admittance points must be the line $l_2$ of Fig. 29. This is also produced in the same manner discussed above with respect to the locus $l_1$, by ganging the $E_R$ and $E_G$ controls, but in an obviously different manner.

However, in this connection, certain restrictions on the range of variation are imposed by the fact that self-sustained oscillations must be prevented. As noted above, if the combined positive conductance of the resonator and its external circuit is less in magnitude than the negative conductance of the electron beam, self-sustained oscillations are produced. This provides a limit in one direction for the variation in G and hence for the variation in Q. As the value of G approaches the value at which oscillations would be produced, the Q becomes higher and higher, since the losses are being directly reduced by the negative G. At the point at which oscillations would break out, the total conductance is zero and Q is theoretically infinite. In practice, of course, while very high values of Q are obtainable, the oscillation point must be avoided. This is done by keeping $I_0$ below the starting current value at this point.

Figure 30:
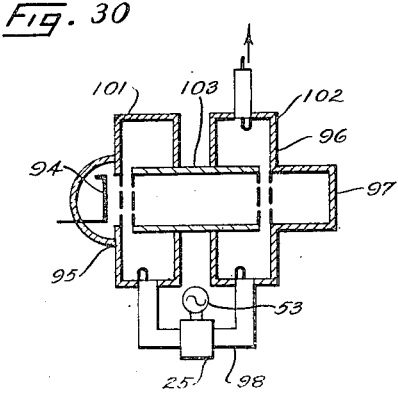
Fig. 30 is a schematic circuit diagram of a system utilizing the present novel variable impedance element as a feedback control.

Another use for the device of the present invention illustrated in any of Figs. 7, 8, 8A, 19, 20, or 21 is as a feedback control for a regenerative oscillator. An example of such oscillator is shown in Fig. 30 and comprises a pair of cavity resonators 101 and 102 joined by a drift tube 103. An electron stream from a cathode 94 is projected successively through a gap 95 in resonator 101, through the interior of drift tube 103 and through a second gap 96 in resonator 102, and is thereafter collected on the walls of the device as at 97. As discussed in Varian Patent No. 2,242,275, granted May 20, 1941, such a device operates as a velocity-modulation amplifier, known as a klystron. By providing a feedback circuit between resonators 101 and 102, self-sustained regenerative oscillations are produced. A feedback path is illustrated at 98 in Fig. 30 and has inserted therein a variable impedance element 25, such as of the type shown in Figs. 7, 8, 8A, 19, 20 or 21.

As discussed above, such a variable impedance element can be used as a phase-shift device or line-stretcher and thus can change the frequency of oscillation of the oscillator device. By controlling this phase shift by modulating signals, as from source 53, frequency modulation is produced. Alternatively or additionally, the amplitude of oscillation can be adjusted by adjusting the amplitude of the feedback by this variable impedance element 25. If such adjustment is varied in accordance with modulating signals, amplitude modulation of the output is derived. In this way an extremely versatile feedback control useful for adjustment or modulation is provided.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A variable impedance element comprising a high-frequency-energy conductor, a pair of electron-permeable electrodes coupled to said conductor and defining a gap across which a voltage is impressed by said conductor, a cathode aligned with said electrodes on one side thereof and a reflector electrode aligned with said electrodes on the side thereof opposite said cathode, a source of electron-accelerating potential coupled between said cathode and one of said electrodes, and a source of electron-reflecting voltage coupled between said cathode and said reflector electrode, said potentials having a magnitude adapted to produce a passive non-oscillatory condition for said element.

2. A variable impedance element adapted for use at ultra-high frequencies, comprising an ultra-high-frequency input conductor adapted to be coupled to a source of ultra-high frequency energy, an ultra-high frequency output conductor adapted to be coupled to a utilization device for ultra-high frequency energy, and a passive non-oscillatory electron-discharge device coupled to said conductors between said source and utilization device, said discharge device comprising a pair of electron-permeable electrodes coupled to both said conductors, a cathode aligned with said electrodes on one side thereof, and a reflector electrode aligned with said cathode and electrodes on the other side of said electrodes, potential supply means coupled to said cathode for accelerating electrons from said cathode through said electrodes, and potential supply means coupled to said reflector electrode for returning said electron through said electrodes while preventing generation of oscillations by said electrons between said electrodes.

3. A variable impedance element for ultra-high-frequency energy comprising a hollow conductive wave guide having a pair of opposite walls, a pair of electron permeable-electrodes connected to said walls, a cathode opposite one of said electrodes, a reflector electrode opposite another of said electrodes, a source of electron-accelerating potential coupled between said cathode and one of said electron-permeable electrodes, and a source of electron-repelling potential coupled between said cathode and said reflector electrode, said potentials being proportioned to produce a non-oscillatory condition between said electron-permeable electrodes.

4. Apparatus as in claim 3, wherein one of said electrodes is coupled to its wave guide wall by means of a cylindrical conductive member extending inwardly from the wall of said guide into juxtaposition with the other of said electrodes.

5. A variable impedance device for ultra-high-frequency energy comprising a coaxial transmission line having an inner conductor and an outer conductor, a pair of electron-permeable electrodes coupled respectively to said conductors, a cathode opposite one of said electrodes, a reflector electrode aligned with said cathode and electrodes on the other side of said electrodes, a source of electron-accelerating potential coupled between said cathode and one of said electron-permeable electrodes, and a source of electron-repelling potential coupled between said cathode and said reflector electrode, said potentials being proportioned to produce a non-oscillatory condition between said electron-permeable electrodes.

6. Apparatus as in claim 5, wherein said transmission line forms an input connection, and further including a second coaxial transmission line having an inner conductor and an outer conductor connected respectively to said electrodes and constituting an output connection.

7. A variable impedance device for ultra-high-frequencies comprising an input ultra-high-frequency energy conductor, an output ultra-high-frequency energy conductor, a cavity resonator coupled to both said conductors and having a pair of adjacent electron-permeable walls, a cathode opposite one of said walls, a reflector electrode opposite the other of said walls, means coupled to said cathode for accelerating the electrons therefrom to pass through said walls, and a source of potential coupled to said reflector electrode for causing the said electrons to re-enter said resonator while preventing the generation of self-sustained oscillations therein.

8. The method of producing a variable passive impedance useful at ultra-high frequencies, comprising the steps of producing a stream of electrons, subjecting said electrons to the action of an alternating electric field in a predetermined region to produce periodic velocity variations thereof, causing said velocity-varied electrons to form a pulsating electron current having a component of the same frequency as said electric field, and returning said pulsating electron current to said region in a phase relation relative to said electric field to prevent self-sustained oscillations, whereby said electron stream provides a passive impedance.

9. An ultra-high frequency amplifier device comprising a source of oscillations to be amplified, a pair of electron-permeable electrodes coupled to said source to have impressed therebetween an alternating voltage corresponding to said oscillations, means for projecting an electron stream through said electrodes to be velocity-modulated by said voltage, a reflector electrode, a source of potential coupled between one of said electron-permeable electrodes and said reflector electrode for returning said velocity-modulated electrons through said electrodes in a phase relation to said voltage producing a negative resistance therebetween, and an output circuit coupled to said electrodes, whereby amplified energy is supplied to said output circuit.

10. An ultra-high frequency modulator comprising a source of oscillations to be modulated, a pair of electron-permeable electrodes coupled to said source to produce a voltage therebetween corresponding to said oscillations, a cathode electrode aligned with said permeable electrodes on one side thereof, a reflector electrode aligned with said permeable electrodes on the other side thereof, a control electrode between said cathode electrode and said permeable electrodes, a source of electron-accelerating potential coupled between said cathode electrode and one of said electron-permeable electrodes, a source of electron-repelling potential coupled between said cathode electrode and said reflector electrode, said potentials being proportioned to produce a non-oscillatory condition between the electron-permeable electrodes, a source of modulated signals coupled to one of said electrodes, and an output circuit coupled to said permeable electrodes, whereby the energy delivered to said output circuit comprises energy from said source modulated by said modulated signal.

11. Ultra-high-frequency-modulating apparatus for an ultra-high-frequency oscillator having a frequency-determining resonant circuit, comprising a pair of electron-permeable electrodes coupled to said circuit, a cathode electrode aligned with said permeable electrodes on one side thereof, a reflector electrode aligned with said permeable electrodes on the other side thereof, a control electrode between said cathode electrode and said permeable electrodes, a source of electron-accelerating potential coupled between said cathode electrode and one of said electron-permeable electrodes, a source of electron-repelling potential coupled between said cathode electrode and said reflector electrode, said potentials being proportioned to produce a non-oscillatory condition between the electron-permeable electrodes, and means for coupling modulating signals to one of said electrodes, whereby the output frequency of said oscillator is correspondingly modulated.

12. Ultra-high-frequency-modulating apparatus for an ultra-high-frequency oscillator having a frequency-determining resonant circuit, comprising a pair of electron-permeable electrodes coupled to said circuit, a cathode electrode aligned with said permeable electrodes on one side thereof, a reflector electrode aligned with said permeable electrodes on the other side thereof, a source of electron-accelerating potential coupled between said cathode electrode and one of said electron-permeable electrodes, a source of electron-repelling potential coupled between said cathode electrode and said reflector electrode, at least one of said sources of potential being adjustable and said potentials being proportioned to produce a non-oscillatory condition between said electron-permeable electrodes, and means for coupling modulating signals to one of said electrodes, whereby the output frequency of said oscillator is correspondingly modulated.

13. Ultra-high-frequency apparatus for tuning a cavity resonator, comprising a pair of electron-permeable electrodes coupled to said resonator, a cathode electrode aligned with said electrodes on one side thereof, a reflector electrode aligned with said permeable electrodes on the other side thereof, a control electrode between said cathode electrode and said permeable electrodes, a source of electron-accelerating voltage coupled between said cathode electrode and one of said electron-permeable electrodes, a source of electron-repelling voltage coupled between said cathode electrode and said reflector electrode, said voltages being proportioned to produce a non-oscillatory condition between the electron-permeable electrodes, and means for adjusting said voltages, whereby said impedance is varied to alter the resonant frequency of said resonator.

14. Ultra-high-frequency apparatus for tuning a cavity resonator, comprising a pair of electron-permeable electrodes coupled to said resonator, a cathode electrode aligned with said electrodes on one side thereof, a reflector electrode aligned with said permeable electrodes on the other side thereof, a source of electron-accelerating voltage coupled between said cathode electrode and one of said electron-permeable electrodes, a source of electron-repelling voltage coupled between said cathode electrode and said reflector electrode, said voltages being proportioned to produce a non-oscillatory condition between the electron-permeable electrodes, and means for adjusting said voltages, whereby said impedance is varied to alter the resonant frequency of said resonator.

15. Apparatus for adjusting the flow of ultra-high-frequency energy from a source to a load, comprising a variable impedance device coupled between said source and load, said device comprising a pair of electron-permeable electrodes, a cathode electrode on one side of said permeable electrodes, a reflector electrode on the other side of said permeable electrodes, an electron-accelerating potential supply means coupled between said cathode electrode and one of said electron-permeable electrodes, and an electron-repelling potential supply means coupled between said cathode electrode and said reflector electrode, at least one of said potential supply means being adjustable and said potentials being proportioned to produce a non-oscillatory condition between said electron-permeable electrodes, said impedance being thereby adjustable by adjusting said potential supply means.

16. Apparatus as in claim 15, further including a control electrode between said cathode and permeable electrodes.

17. Apparatus as in claim 15 wherein said source and load are directly connected by an ultra-high-frequency energy conductor, and said permeable electrodes are coupled to said conductor by means of a second conductor in shunt with said first conductor.

18. Apparatus as in claim 15 wherein said permeable electrodes are coupled directly to said source and to said load by respective input and output conductors.

19. An adjustable selectivity and/or frequency filter comprising a resonant circuit, a pair of electron-permeable electrodes coupled to said circuit, a cathode electrode aligned with said permeable electrodes on one side thereof, a reflector electrode aligned with said permeable electrodes on the other side thereof, electron-accelerating potential supply means coupled between said cathode and one of said electron-permeable electrodes, and electron-repelling potential supply means coupled between said cathode and said reflector electrode, at least one of said potential supply means being adjustable and said potentials being proportioned to produce a non-oscillatory condition between said electron-permeable electrodes, said impedance being variable upon adjustment of said supply means.

20. In combination, a source of ultra-high-frequency energy, an impedance, coupling means between said source and said impedance, and adjustable means coupled in shunt with said coupling means, said adjustable means comprising a variable impedance element having a pair of electron-permeable electrodes, a cathode electrode aligned with said permeable electrodes on one side thereof, a reflector electrode aligned with said permeable electrodes on the other side thereof, a source of electron-accelerating potential coupled between said cathode and one of said permeable electrodes, a source of electron-reflecting potential coupled between said cathode and said reflector electrode, said potentials being proportioned to produce a passive non-oscillatory condition between said electron-permeable electrodes, a source of modulating signals, and means for varying the density of the electrons repelled by said reflector electrode in accordance with said modulating signals.

21. The combination of claim 20, wherein said electron-permeable electrodes are located in opposed walls of a hollow wave guide.

22. The combination of claim 20, wherein one of said electron-permeable electrodes is located in the wall of a hollow wave guide and the other of said electron-permeable electrodes is connected across an aperture in an opposed wall of said wave guide by means of a cylindrical conductive member extending into said wave guide.

23. The combination of claim 20, wherein said electron-permeable electrodes are connected to the inner and outer conductors of a coaxial line.

24. The combination of claims 20, wherein said electron-permeable electrodes are located in opposed walls of a cavity resonator.

25. In combination, a source of ultra-high-frequency energy, an impedance, coupling means between said source and said impedance, and adjustable means coupled in shunt with said coupling means, said adjustable means comprising a variable impedance element having a pair of electron-permeable electrodes, means for projecting a stream of electrons through said electrodes, a reflector electrode, a source of potential coupled between one of said electron-permeable electrodes and said reflector electrode for returning said electrons through said electrodes to produce a passive non-oscillatory condition between said electrodes, a source of modulating signals, and means for varying the density of the returned electrons in accordance with said modulating signals.

26. The combination of claim 25, wherein said permeable electrodes are coupled to said coupling means by an ultra-high-frequency energy conveyor connected in shunt with said coupling means.

DONALD R. HAMILTON.

REFERENCES CITED

The following references are of record in the file of this patent:

UNITED STATES PATENTS

| Number | Name | Date |
|---|---|---|
| 2,278,210 | Morton | Mar. 31, 1942 |
| 2,414,785 | Harrison et al. | Jan. 21, 1947 |
| 2,438,768 | Stewart | Mar. 30, 1948 |
| 2,453,453 | Norton | Nov. 9, 1948 |
| 2,482,768 | Hansen et al. | Sept. 27, 1949 |
| 2,485,029 | Bradley | Oct. 18, 1949 |
| 2,500,637 | Kinzer | Mar. 14, 1950 |
| 2,512,980 | Sunstein | June 27, 1950 |